United States Patent
Arasu et al.

(10) Patent No.: US 10,496,833 B2
(45) Date of Patent: Dec. 3, 2019

(54) CONTROLLING SECURE PROCESSING OF CONFIDENTIAL DATA IN UNTRUSTED DEVICES

(71) Applicant: Microsoft Technology Licensing, LLC, Redmond, WA (US)

(72) Inventors: Arvind Arasu, Redmond, WA (US); Kenneth Eguro, Seattle, WA (US); Manas Rajendra Joglekar, Stanford, CA (US); Raghav Kaushik, Kirkland, WA (US); Donald Kossmann, Kirkland, WA (US); Ravishankar Ramamurthy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/100,787

(22) Filed: Aug. 10, 2018

(65) Prior Publication Data

US 2019/0005254 A1    Jan. 3, 2019

Related U.S. Application Data

(62) Division of application No. 14/880,186, filed on Oct. 9, 2015, now Pat. No. 10,073,981.

(51) Int. Cl.
*G06F 21/62*   (2013.01)
*G06F 21/60*   (2013.01)
(Continued)

(52) U.S. Cl.
CPC ...... *G06F 21/606* (2013.01); *G06F 16/24552* (2019.01); *G06F 21/62* (2013.01);
(Continued)

(58) Field of Classification Search
CPC ...... G06F 21/6218; G06F 21/72; G06F 21/76; G06F 16/24552
See application file for complete search history.

(56) References Cited

U.S. PATENT DOCUMENTS

2006/0080668 A1* 4/2006 Blackmore ............. G06F 9/544
                                                             719/312
2011/0072006 A1* 3/2011 Yu ..................... G06F 16/2471
                                                             707/718

(Continued)

OTHER PUBLICATIONS

Arasu et al., "Orthogonal Security With Cipherbase", 10 pages (Year: 2013).*

(Continued)

*Primary Examiner* — Thaddeus J Plecha
(74) *Attorney, Agent, or Firm* — Rainier Patents, P.S.

(57) ABSTRACT

A number of transmissions of secure data communicated between a secure trusted device and an unsecure untrusted device in a DBMS is controlled. The data is communicated for database transaction processing in the secure trusted device. The number of transmissions may be controlled by receiving, from the untrusted device, an encrypted key value of a key and a representation of an index of a B-tree structure, decrypting, at the trusted device, the key and one or more encrypted index values, and initiating a transmission, a pointer value that identifies a lookup position in the index for the key. The index comprises secure, encrypted index values. Other optimizations for secure processing are also described, including controlling available computation resources on a secure trusted device in a DBMS and controlling transmissions of secure data that is communicated between a secure trusted device and an unsecure untrusted device in a DBMS.

20 Claims, 17 Drawing Sheets

(51) Int. Cl.
*H04L 9/08* (2006.01)
*H04L 29/06* (2006.01)
*G06F 21/76* (2013.01)
*G06F 21/72* (2013.01)
*G06F 16/2455* (2019.01)
*H04L 9/06* (2006.01)
*G06F 16/22* (2019.01)

(52) U.S. Cl.
CPC ...... *G06F 21/6218* (2013.01); *G06F 21/6227* (2013.01); *G06F 21/72* (2013.01); *G06F 21/76* (2013.01); *H04L 9/0637* (2013.01); *H04L 9/088* (2013.01); *H04L 9/0819* (2013.01); *H04L 9/0822* (2013.01); *H04L 63/0428* (2013.01); *H04L 63/061* (2013.01); *G06F 16/2228* (2019.01); *G06F 16/2246* (2019.01); *H04L 2463/062* (2013.01)

(56) References Cited

U.S. PATENT DOCUMENTS

| | | | |
|---|---|---|---|
| 2011/0119687 A1* | 5/2011 | McGovern | G06F 9/4415 719/327 |
| 2012/0131253 A1* | 5/2012 | McKnight | G06F 1/30 710/308 |
| 2014/0122476 A1* | 5/2014 | Kaliski, Jr. | G06F 21/6227 707/736 |
| 2017/0316055 A1* | 11/2017 | Chen | G06F 16/2471 |

OTHER PUBLICATIONS

Arasu et al., "Transaction processing on confidential data using cipherbase", pp. 435-446 (Year: 2015).*

* cited by examiner

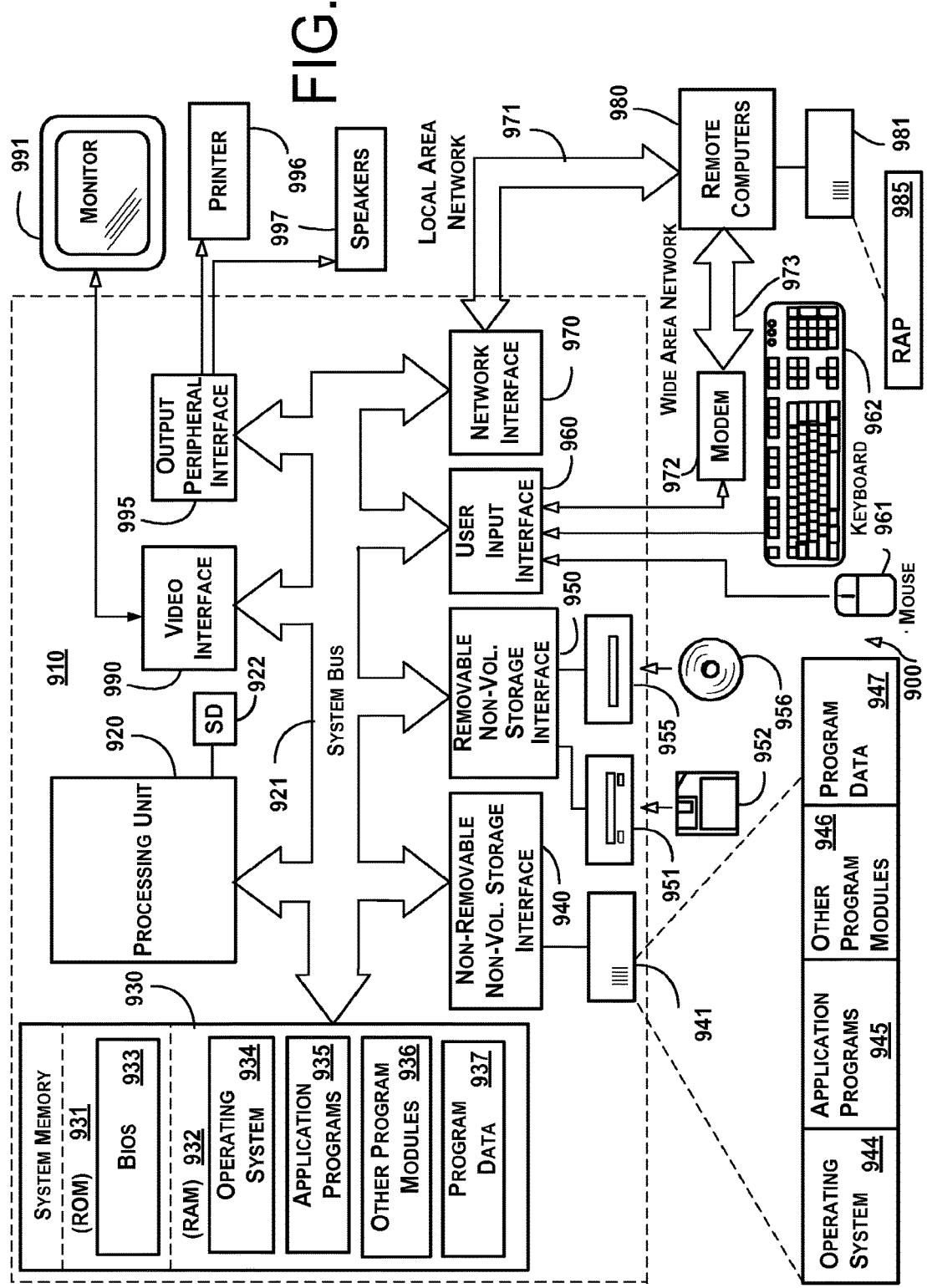

CONTROLLING SECURE PROCESSING OF CONFIDENTIAL DATA IN UNTRUSTED DEVICES

BACKGROUND

Users of electronic devices frequently need to access database systems to obtain various types of information and/or perform various operations. Many different techniques have been devised for controlling storage and retrieval of data items in database management systems (DBMSs). Confidentiality of data in database management systems is an ongoing concern, as owners of data may prefer that their information is protected from being observed/used by others. As an example, concerns over data security and data breaches may hinder the adoption of cloud technologies. Data may be a valuable asset and unprotected data in the cloud may be vulnerable to hackers and/or snooping administrators.

SUMMARY

According to one general aspect, a system may include at least one hardware device processor, and a computer-readable storage medium storing executable instructions that, when executed, cause one or more of the at least one hardware device processor to control a number of transmissions of secure data that is communicated between a secure trusted device and an unsecure untrusted device in a database management system. The data is communicated for database transaction processing in the secure trusted device. The number of transmissions is controlled by receiving, from the untrusted device, an encrypted key value of a key and a representation of an index of a B-tree structure, the index comprising secure, encrypted index values, decrypting, at the trusted device, the key and one or more of the encrypted index values, and initiating a transmission, in response to the receiving, a pointer value that identifies a lookup position in the index for the key.

In another aspect, a system may include at least one hardware device processor, and a computer-readable storage medium storing executable instructions that, when executed, cause one or more of the at least one hardware device processor to control available computation resources on a secure trusted device in a database management system (DBMS). The resources are controlled by receiving, at the secure, trusted device, from an untrusted device, a request to perform one or more database processing operations on data that is stored in secure, encrypted form at the untrusted device, and initiating the one or more database processing operations using a plurality of stack machines that are physically hosted at the secure, trusted device.

In another aspect, a system may include at least one hardware device processor, and a computer-readable storage medium storing executable instructions that, when executed, cause one or more of the at least one hardware device processor to control a number of transmissions of secure data that is communicated between a secure trusted device and an unsecure untrusted device in a database management system (DBMS). The data is communicated for database transaction processing in the secure trusted device. The number of transmissions is controlled by obtaining, at the untrusted device, one or more intra-transaction batched database transaction processing requests, each transaction processing request comprising a plurality of query expressions on secure, encrypted data, the plurality of query expressions folded into a single evaluation call for processing at the secure trusted device, initiating a transmission in a single communication operation, from the untrusted device, to the secure trusted device, of the one or more intra-transaction batched database transaction processing requests, and receiving, from the secure trusted device, in response to the transmission, results of processing of the intra-transaction batched database transaction processing requests that is performed at the secure trusted device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 9 is a block diagram of an example architecture for an example encrypted DBMS (EDBMS).

DETAILED DESCRIPTION

I. Introduction

Figure 1:
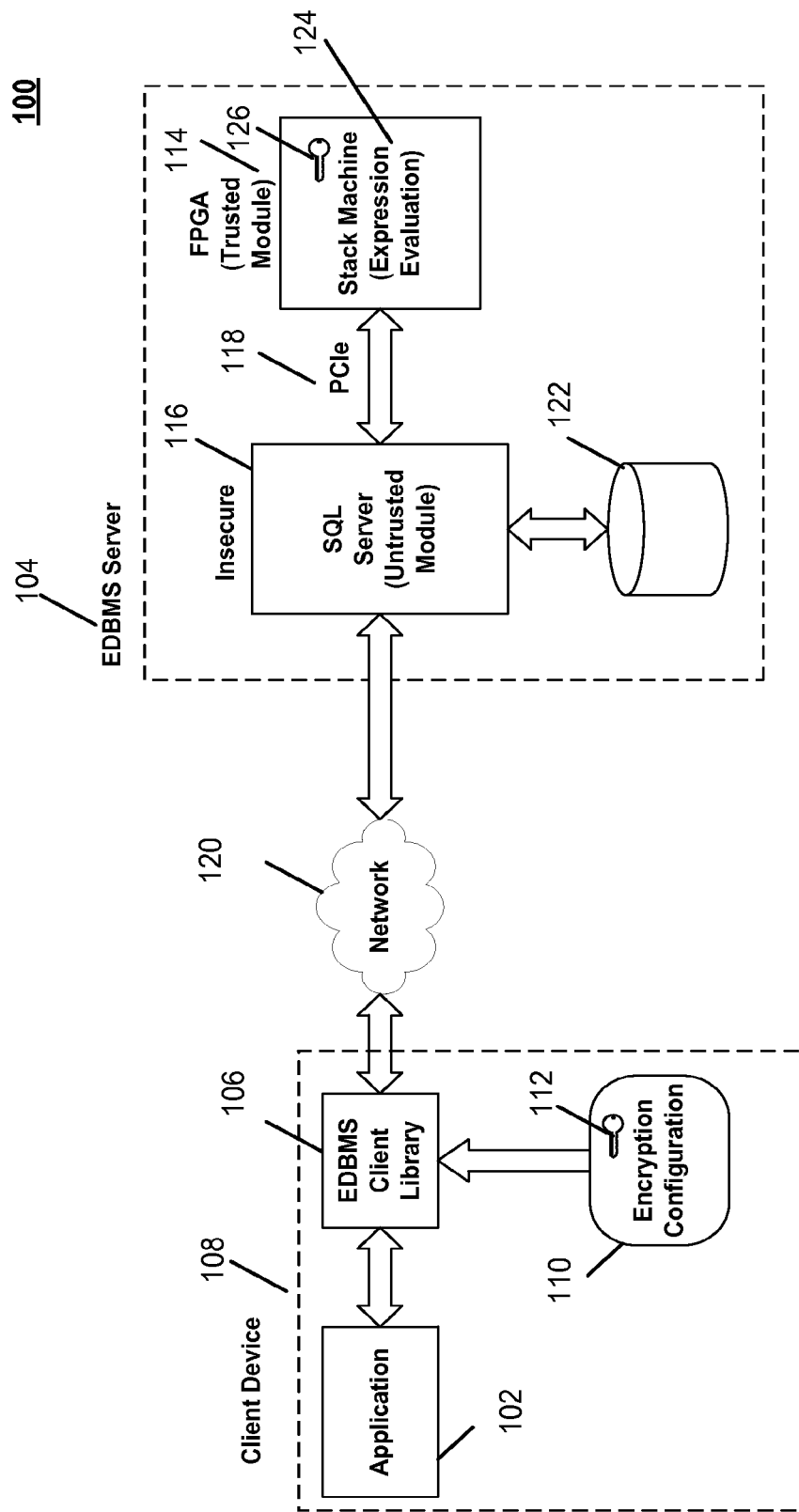
FIG. 1 is a block diagram of an example encrypted DBMS (EDBMS) architecture.

Recent developments in hardware platforms have exploited various processors, and various storage devices, in efforts to provide higher performance (e.g., speed, efficiency) and more secure processing of confidential data. Confidentiality of data in database management systems is an ongoing concern. As an example, concerns over data security and data breaches may hinder the adoption of cloud technologies. Data may be a valuable asset and unprotected data in the cloud may be vulnerable to hackers and/or snooping administrators. Thus, it may be advantageous to provide database management systems (DBMSs) that can guarantee strong data confidentiality, where an adversary cannot learn information about the data. For example, such a DBMS may address security vulnerabilities and possible spawn new opportunities in cloud database-as-a-service.

Example techniques discussed herein may be used, for example, for a database management (DBMS) system designed for efficient transaction processing that provides strong end-to-end data confidentiality guarantees through encryption. For example, the system may use a lightweight trusted device, or module, that runs on a secure hardware platform but which performs the bulk of database processing in an untrusted device, or module. The system may incorporate a variety of optimizations configured to achieve advantageous performance for transactional workloads. For example, such optimizations may include hardware-software co-design optimizations, optimizations to minimize the latency between secure hardware and the main system, techniques to cope with space inefficiencies, and techniques to pack more work into a smaller number of separate communications.

In many computing applications it is desirable to keep data secure. For example, in a medical setting, regulations may require that security measures be used to prevent patient data from being accessed by unauthorized parties. If financial data, such as credit card numbers or social security numbers for customers of a business, were obtained by malicious parties, large financial losses could occur. As another example, in a military setting (or other type of defense setting, or governmental use setting), it may be desirable from a perspective of national security to keep data from being accessed by unauthorized parties.

To protect data, enterprises may maintain their own computer systems using various security techniques to prevent unauthorized access to data. The enterprise can use physical and electronic techniques to control access to secure data. An alternative approach to protect data, even when access to the data cannot be precluded in all cases, is to encrypt the data when stored in the computer system.

Data that has been encrypted, or otherwise processed such that, even if an unauthorized party accesses the data, that party cannot determine the meaning of the data, may be referred to as "ciphertext." For example, in a corporate network, confidential data may be stored as ciphertext, except when actually being processed. By controlling the security information, such as encryption keys, that can convert ciphertext to "plaintext" (or "cleartext"), security of the data may be maintained by limiting existence of data in plaintext except in highly restrictive settings that are secure.

However, a client may wish to store and/or process data in "the cloud." Cloud service providers (rather than the enterprises that have data to process) currently provide computing resources, including processing and database storage. For example, a cloud service provider may make computing resources available to the customers, each of which may make a service level agreement (SLA) with the cloud service provider to have access to a certain level of computing resources. The enterprises may access these resources by submitting jobs over the Internet for processing on the computer resources "rented" from the cloud service provider.

While data may be transmitted over the Internet as ciphertext, once it is received by the cloud service provider, it is, for many operations, converted to plaintext. As a result, employees of the cloud service provider, who may be outside the enterprise, may have access to the plaintext data and possibly to the security information for converting the ciphertext to plaintext.

As an example, CIPHERBASE is a comprehensive database system that provides strong end-to-end data confidentiality through encryption (for example discussions of secure processing, see, e.g., U.S. Patent Application Publication No. 2014/0281512, entitled "Secure Query Processing Over Encrypted Data," with inventors Arasu et al., filed Mar. 15, 2013; U.S. Patent Application Publication No. 2014/0281511, entitled "Secure Data Processing on Sensitive Data using Trusted Hardware," with inventors Kaushik et al., filed Aug. 27, 2013; and U.S. Patent Application Publication No. 2014/0164758, entitled "Secure Cloud Database Platform," with inventors Eguro et al., filed Dec. 7, 2012).

For example, CIPHERBASE is based on an architecture that combines an industrial strength database engine (e.g., SQL Server) with lightweight processing over encrypted data that is performed in secure hardware. This example system advantageously has a small trusted computing base (TCB) and provides advantageous benefits over the previously existing systems in terms of security, performance, and functionality.

As discussed further below, an example implementation of such an example system may use Field-programmable Gate Arrays (FPGAs) to provide secure processing for transactional workloads (e.g., in hardware—either as part of a server, or as an external hardware device—with physical isolation, or physical separation from the server). As another example, virtual implementations (e.g., using hypervisor or virtual machines that are logically separated, or logically isolated) may provide the secure processing for transactional workloads. The discussion below includes example techniques that may be implemented to achieve competitive performance, including hardware-software co-design issues (e.g., how to advantageously offer parallelism), optimizations to hide (e.g., minimize) the latency between the secure hardware and the main system, and example techniques to cope with space inefficiencies. These example optimizations are designed to not affect end-to-end data confidentiality. For example, experimental results with TPC-C have indicated that when customer data is strongly encrypted in an example CIPHERBASE implementation, it may provide 90% the throughput of Structured Query Language (SQL) SERVER operating over unencrypted data. For example, even when all data is strongly encrypted, the example implementation may achieve 40% the throughput of plaintext SQL SERVER.

There has been substantial academic and industry work seeking to ensure database data confidentiality using encryption. For example, the general idea involves keeping data encrypted and limiting access to encryption keys, to keep the data confidential. In the end, it may be desirable to have database systems that, while preserving data confidentiality, are general and performant. In this context, general means that the system supports full structured language (SQL) and features such as stored procedures, transactions, and recovery. Furthermore, it may be desirable that a legacy application will run unchanged, except for a thin shim to handle encryption/decryption. In this context, performant means that throughput and latency is competitive with a state-of-the-art database system that does not provide confidentiality. As discussed further below, work in this area may involve various types of limitations in desired dimensions of data confidentiality, generality, and/or performance.

In accordance with example techniques discussed herein, an example DBMS may achieve data confidentiality through encryption, providing industrial strength transactional functionality with competitive performance while keeping all data that might be accessible to an adversary strongly encrypted. Such an example system may be based on an architecture that extends a traditional database system with lightweight trusted computation running on secure hardware. This lightweight trusted computation may advantageously provide a number of security, functionality, performance, and software engineering benefits. For example, such an example architecture may be modified to generate other advantageous systems that trade off, e.g., performance for stronger data confidentiality.

As an example, a DBMS server may implement expression evaluation using a stack machine (e.g., as an abstraction), compiling tasks into database primitive programs that implement queries and sub-queries. For example, a trusted, secure module (e.g., a device) may also implement one or more stack machines for expression evaluation.

Example optimization techniques discussed herein may advantageously aid in computation efficiency by reducing a total number of round trips between an untrusted device and a trusted, secure device for database transaction processing, while preserving end-to-end security of processed data. Example optimization techniques discussed herein may advantageously increase concurrency in the processing tasks.

Example optimization techniques discussed herein may advantageously reduce an amount of data transferred between the untrusted device and the trusted device for the database transaction processing, and/or may reduce the number of messages transferred. Further, example optimization techniques discussed herein may advantageously provide an ability to maximize an amount of work performed with the data that is transferred between the untrusted device and the trusted device.

For example (as discussed further below), such optimization techniques may include utilizing index lookup vectorization for index lookups, utilizing multiple stack machines at the trusted, secure device (e.g., to parallelism in multiple stack machine instances on the device), utilizing work unit batching, utilizing expression folding, utilizing data caching at the trusted device, and utilizing function result caching. In this context, index "vectorization" may refer to obtaining an index as a vector of the keys stored in a node of a search structure (e.g., a B-tree node). For example, the node may be stored as a page of storage, in encrypted form. In accordance with example techniques discussed herein, the page (in encrypted form) may be transmitted to the trusted module (TM) for processing, thus reducing a number of transmissions needed for searching the search structure.

Query processing may be a challenge for database systems that use encryption to provide confidentiality, as encryption "hides" data, making it difficult to perform operations over it. Conventionally, there have been two broad techniques for addressing this: (1) use homomorphic encryption schemes that allow computation directly over ciphertext, or (2) use a trusted module that is inaccessible to the adversary to temporarily operate on data in plaintext.

Fully homomorphic encryption schemes that allow arbitrary computation over ciphertext may be currently slow. However, there are practical partial homomorphic encryption (PHE) schemes that support limited operations. For example, CRYPTDB is a recent system that may rely purely on PHE for query processing (see, e.g., Popa et al, "CryptDB: Protecting Confidentiality with Encrypted Query Processing," in *Proceedings of the Twenty-Third ACM Symposium on Operating Systems Principles* (SOSP '11), pp. 85-100, 2011). However, since PHE schemes do not support all operations, there may exist simple queries (including queries in the TPC-C benchmark) that such systems may not support without sacrificing confidentiality. Another potential issue with the PHE-only approach is that data confidentiality may be closely tied to, and thus limited by, the operations performed over the data. For example, if equality predicates are to be applied on a column, the values are stored using deterministic encryption, thereby revealing the frequency distribution.

Some conventional techniques may add the capability to use the client for trusted computation. Such example systems may use PHE to perform encrypted query processing in the server, to the extent possible, and then use a fallback plaintext database system running on the client to perform any remainder query processing. Again, since PHE schemes may not support all operations, there may exist simple queries that may involve extensive data movement or a large number of roundtrips over a relatively low-bandwidth, high-latency network. For example, client-based approaches may incur up to two orders of magnitude slowdown on TPC-C with strong encryption.

For example, TRUSTEDDB (see, e.g., Bajaj et al., "TrustedDB: A Trusted Hardware Based Database with Privacy and Data Confidentiality," in *Proceedings of the* 2011 *ACM SIGMOD International Conference on Management of Data* (SIGMOD'11), 2011) is a recent system that introduces a concept of adding a trusted module to the server, using secure hardware to provide a protected location in which to perform processing. The example server-based trusted module has higher communication bandwidth and lower latency compared to the client machine. However, TRUSTEDDB runs a complete database system within its trusted module, leading to potential issues: (1) the trusted computing base (TCB) of TRUSTEDDB (i.e., the code with access to client encryption keys and plaintext) is an entire database system. For example, ensuring the cloud consumer that such a large code base is free of vulnerabilities may be difficult. (2) Current secure hardware such as the cryptographic co-processors used in TRUSTEDDB may be an order-of-magnitude slower than regular (e.g., INTEL) processors. Because of this the performance of TRUSTEDDB may face issues when most of the data is confidential and must be handled in the co-processor. (3) The resource constraints of the secure hardware may involve TRUSTEDDB running SQLITE, which may cause issues in functionality (e.g., the number of supported features in SQLITE may be smaller than a standard commercial database).

In accordance with example techniques discussed herein, an example encrypted database management system (EDBMS) such as CIPHERBASE may include (at least) features such as a lightweight trusted computing base (TCB), rich functionality, strong, interpretable data confidentiality, high performance, and utilization of FPGAs as secure hardware, as discussed further below.

For example, like TRUSTEDDB, CIPHERBASE may rely on in-server secure hardware. However, the logic in the trusted hardware of CIPHERBASE may include a simple stack machine used to evaluate expressions over encrypted values and may not perform full query processing. For example, an overall size of TCB may be only a few thousand lines of VERILOG. For example, code of this size may be amenable to formal verification to prove it is free from bugs and backdoors.

For example, an architecture of CIPHERBASE may minimally modify an industrial-strength DBMS (e.g., SQL SERVER), farming out low-level expression evaluation logic to the trusted module (TM). Such an example design may allow a system such as CIPHERBASE to inherit rich functionality from SQL SERVER for "free". For example, a system such as CIPHERBASE may support the concurrency and recovery features of SQL SERVER without additional code. For example, CIPHERBASE may be able to run the full TPC-C benchmark with all data strongly encrypted, while supporting features such as stored procedures, indexes, and recovery.

For example, CIPHERBASE may support column-level encryption and an application may pick different encryption schemes for different columns. Unlike many conventional systems where the choice of encryption may impact performance and/or functionality, the performance of CIPHERBASE may remain robust and the functionality may be unaffected. For example, when all columns in TPC-C are changed from plaintext to strongly encrypted, the performance of CIPHERBASE may drop by about a factor 2. For example, this number may be around 100 for a client-based system.

For example, the lightweight trusted module may help systems such as CIPHERBASE to achieve high performance. For example, all but a small fraction of the actual processing may occur in the insecure host system, which may have significantly more computational and memory resources. This division of labor between untrusted and trusted hardware may be arranged to ensure that end-to-end data confidentiality is not undermined.

Reasoning about end-to-end data confidentiality is subtle for any system that uses secure hardware. For example, an adversary may learn about the underlying data just by looking at patterns of data movement to and from the trusted module.

While much of the design of CIPHERBASE may be agnostic to the choice of secure hardware, an example system may rely on a Peripheral Component Interconnect Express (PCIe)-based FPGA board. For example, while conventional systems may place a FPGA along the datapath to the main processing system, the example FPGA of CIPHERBASE is part of the inner loop of query processing. For example, in the TPC-C NEWORDER transaction, there may be about 1000 (unoptimized) roundtrips to the FPGA. As discussed further herein, with hardware-software co-design as discussed herein, these roundtrips may be advantageously controlled/managed without unacceptable degradation of performance.

Such an example EDBMS may provide secure query processing over encrypted data without disclosing information, except for permitted information. For example, a client machine may specify in a security model which information is permitted and which is not permitted to be disclosed during query processing. The client machine may establish the security model with an untrusted component and a trusted component of a secure query processing system. For example, a driver running on the client machine may translate the set of queries into secure query plans that follow the secure model. The driver may generate the secure query plans, including by replacing insecure operators with secure operators that are implemented by the trusted component of the secure query processing system.

For example, the trusted component may be configured to support the security model by producing secure query results for the secure query plans. The secure query results may comply with the security model and only reveal information permitted by the client machine. For example, the client machine may establish the security model specifying column-level security settings.

For example, the untrusted component may include an untrusted server running on a network resource for storing the client machine's data and providing the client machine with secure query results that comply with the security model.

In accordance with example techniques discussed herein, a client application may interact with a system such as CIPHERBASE just as it would with a conventional DBMS: using ad-hoc queries, stored procedures, and SQL scripts. A client library (e.g., CIPHERBASE client) may mediate between the application and the CIPHERBASE server, providing the application with a transparent interface.

For example, data confidentiality for each column may be independently specified using a column-level encryption scheme. Informally, a system such as CIPHERBASE may ensure that whenever a value (or derived value) is in the cloud, outside of the secure hardware module, it is encrypted using the specified (or stronger) encryption scheme. The supported encryption schemes may be vetted standards: (1) strong encryption, which is non-deterministic (i.e., multiple encryptions of the same plaintext will produce different ciphertext). This may provide strong data-at-rest security—formally, indistinguishability under chosen-plaintext attack (IND-CPA). For example, this may be implemented in CIPHERBASE with Advanced Encryption Standard (AES) in counter (CTR) mode; (2) deterministic encryption, which generates the same ciphertext from a given plaintext value. This allows plaintext equality to be checked without first decrypting by directly comparing ciphertext values, which may be useful for operations such as equality filters, joins, and grouping. For example, this may be implemented in CIPHERBASE with AES in electronic code book (ECB) mode.

Tables 1a-1b below illustrate columnar encryption for an example instance of the Account table of the Transaction Processing Performance Council's (TPC) TPC-C benchmark.

TABLE 1a

| AcctID | AcctBal | Branch |
|---|---|---|
| 1 | 100 | Seattle |
| 2 | 200 | Seattle |
| 3 | 200 | Zurich |

Table 1a illustrates the original, plaintext instance of the table.

TABLE 1b

| AcctID | AcctBal (RND) | Branch (DET) |
|---|---|---|
| 1 | 0x1a6997ad | 0xff744ed2 |
| 2 | 0x739bd8c9 | 0xff744ed2 |
| 3 | 0xca451f61 | 0x590cbf04 |

Table 1b illustrates the encrypted version of the table using a policy that specifies that the AcctID column is stored in plaintext, the AcctBal column is probabilistically encrypted (RND), and the Branch column is deterministically encrypted (DET).

An example goal of a system such as CIPHERBASE may include ensuring data confidentiality from entities with privileged operating system (OS) and database access. To characterize this threat, an example strong adversary may have unbounded observational power of a cloud server and may be able to view the contents of the server's memory/disk at every instant, along with all external and internal communication. For example, a strong adversary may not be able to observe state or computations within the secure hardware—as discussed further herein, it may be specifically designed to provide such protection.

For example, a related threat may be exemplified by a datacenter operator with physical access to a cloud server and who can walk away with the contents of the server's disk/memory (e.g., using a cold boot attack). To model this threat, an example weak adversary may be introduced, who can obtain a one-time snapshot of data-at-rest. For example, data-at-rest refers to any data that persists across query lifetimes such as data in disk and buffer pool. As the naming suggests, a strong adversary can learn anything a weak adversary is able to learn.

Both strong and weak adversaries discussed herein may model idealizations that aid in characterizing data confidentiality, and the power of real-world adversaries may fall in-between these two. For example, the data center operator above might get access to the state of some queries running at the time of the snapshot, so he/she may be slightly stronger than a weak adversary. For example, both strong and weak adversaries may be passive (e.g., honest but curious) and may not tamper with contents of the database or influence query processing.

An example DBMS's data (and query) confidentiality guarantees may be specified by describing what an adversary can (and cannot) learn. For simplicity of discussion, only the case in which all columns are strongly encrypted is covered herein.

As a starting point, an example DBMS such as CIPHERBASE may not provide metadata confidentiality beyond name anonymization. Thus, even a weak adversary may learn the number of tables, the number of columns in each table, (primary) key properties, the cardinalities of tables and the lengths of data values. Beyond this, though, the example DBMS may provide high data confidentiality against the weak adversary that directly corresponds to the encryption level specified for each column. In particular for strongly encrypted columns, data may remain strongly encrypted in the server's disk and memory, so a weak adversary may not learn anything additional from a system snapshot. An exception to this is range indexes, which are discussed below.

Against a strong adversary, the example DBMS may provide operational data confidentiality; i.e. the adversary may learn some information, based on the operations performed over the data. For example, it may be desirable to provide semantic security where a strong adversary does not learn anything. However, this may be impractical since even communicating encrypted results over an untrusted network reveals some information.

For example, the data confidentiality provided by the example DBMS may be equivalent to that of an abstract system that uses an oracle for computations over strongly encrypted values. For non-boolean operations such as addition, the oracle may take in encrypted inputs and produce encrypted outputs—thus, the adversary may not learn any additional information. For boolean operations such as checking a filter condition or checking equality for joins and grouping, the oracle may return the boolean result in plaintext—thus, the strong adversary may learn certain relations for encrypted values.

Tables 2a-2b below summarize example information that may be leaked to a strong adversary by various relational operators.

TABLE 2a (CIPHERBASE)

| Operation | Strong | Weak |
|---|---|---|
| $\sigma_{A=5}(R)$ | Unknown predicate p(A) over R tuples | Nothing |
| $R \bowtie_A S$ (hash-based) | The join graph and equivalence relations over R(A) and S(A) for joining A values | Nothing |
| $\pi_{A+B}(R)$ | Nothing | Nothing |
| $\mathcal{G} \, by_A^{SUM(B)}(R)$ (hash-based) | The equivalence relation over R(A) | Nothing |
| $\sigma_{A=5}(R)$ using an equality index on A | Set of R tuples having unknown common A values | Nothing |
| $\sigma_{A=5}(R)$ using a range index on A | Set of R tuples having unknown common A values (& ordering) | Ordering of R tuples based on A values |

TABLE 2b (CRYPTDB)

| Operation | Strong ≃ Weak[#] |
|---|---|
| $\sigma_{A=5}(R)$ | Equivalence relation over R(A) |
| $R \bowtie_A S$ (hash-based) | The join graph and equivalence relation over R(A) and S(A) for all A values |
| $\pi_{A+B}(R)$ | Nothing |
| $\mathcal{G} \, by_A^{SUM(B)}(R)$ (hash-based) | The equivalence relation over R(A) |
| $\sigma_{A=5}(R)$ using an equality index on A | The equivalence relation over R(A) |
| $\sigma_{A=5}(R)$ using a range index on A | Ordering of R tuples based on A values |

For example, to evaluate $\sigma_{A=5}(R)$, the abstract system may provide encrypted A values to the oracle, which returns true if a value is 5 and false otherwise. Since the details of the predicate are internal to the oracle, the adversary may only learn the value of some unknown predicate p(A) over R tuples. For the join $R \bowtie_A S$, the oracle may be used to check equality of A values for the R and S tuples. This may reveal the join graph and the equivalence relations of column A values for the R and S tuples participating in the join. Grouping on attribute R(A) may likewise invoke the oracle for checking equality of A values, revealing the equivalence relation of R(A); this may reveal the number of distinct values and their frequencies. Finally, the query $\pi_{A+B}(R)$ does not involve any boolean operations. Thus, it may not leak any information to the strong adversary. (The above information leakage is reference based, not value-based, which may be used to show that it subsumes access pattern leakage.)

Indexes on tables may have different data confidentiality guarantees. An example DBMS such as CIPHERBASE may support two kinds of indexes: equality indexes that support equality lookups and range indexes that support range lookups. For example, an equality index may provide operational data confidentiality against a strong adversary; i.e., when CIPHERBASE uses an equality index for the lookup $\sigma_{A=5}(R)$, the adversary may learn which of the R records have the same A value, but may not learn the common value (5). In the limit, if the entire key space is queried, the adversary may learn the full equivalence relation of column A. At the same time, a weak adversary may not learn anything from an equality index. On the other hand, for a range index an example DBMS such as CIPHERBASE may reveal the full ordering information of the index keys, even to a weak adversary. In other words, range indexes in an example DBMS such as CIPHERBASE may provide similar confidentiality guarantees as order preserving encryption (OPE). However, existing constructions of OPE may either leak higher-order bits of plaintext values or may require a client-side component and do not guarantee encryption immutability. (Informally, in a mutable encryption scheme, the encryption of a value could change when other values are inserted.) The range indexes of an example DBMS such as CIPHERBASE may not have these limitations (there is an additional distinction for non-clustered indexes as discussed further below).

For example, conventional systems using PHE may provide weaker operational data confidentiality (e.g., summarized in Table 2b using CRYPTDB as a representative). Their guarantees may be weaker since (1) operational information may be leaked even to the weak adversary and (2) the scope of information leakage may be an entire column, not just the data touched during query processing. As an example, to be able to evaluate $\sigma_{A=5}(R)$, values of column A may be stored on disk using deterministic encryption, which may reveal the full equivalence relation. For the same query, if an example DBMS such as CIPHERBASE uses a scan-based plan, only the truth values of a hidden predicate p(A) over R tuples may be revealed (e.g., an index-based plan may reveal the equivalence relation, limited to the records in the output). For example, client-based systems may avoid operational information leakage, but at the cost of potentially extensive data shipping.

In accordance with example techniques discussed herein, an example architecture and overview of query and transaction processing are discussed below.

A substantial part of database processing may not involve data value semantics. This may include moving data, query setup/result communication, and almost all of concurrency control and recovery. Almost all of this processing may be unaffected whether plaintext or encrypted data is being handled. An example DBMS such as CIPHERBASE may exploit this observation and use a regular DBMS (e.g., SQL SERVER) to realize this functionality.

At the same time, a core part of database processing may depend on data value semantics, including query expression evaluation over tuples and comparisons during index traversals. In general, this may not be performed directly over encrypted data (e.g., for strongly encrypted data, basic operations such as equivalent plaintext comparison or addition may not be performed). In an example DBMS such as CIPHERBASE such processing may be factored out and it may be run in a trusted module (TM). For example, the trusted module may be designed to be inaccessible to the adversary, allowing the system to securely decrypt data and perform operations on plaintext.

More concretely, the example TM may only support simple expression evaluation over encrypted basic types—no other aspect of database functionality. Such a small example TM may not only provide well-recognized security advantages, but may also provide benefits related to concurrency/recovery, multi-tenancy, and database administration.

A small TM that includes only expression evaluation may introduce performance challenges: the example system may potentially need to make one TM roundtrip for every operation—for the TPC-C NewOrder transaction this may involve over 1000 roundtrips. When the TM runs on a separate device, the example design may incur substantial latencies. Example techniques discussed herein may provide optimizations that control/manage this latency, for example, for an FPGA-based trusted module.

FIG. 1 is a block diagram of an example encrypted DBMS (EDBMS) architecture 100 in accordance with the example techniques discussed herein. As shown in FIG. 1, an application 102 interacts with the example EDBMS 104 through an example EDBMS client module 106 on a client device 108. The EDBMS client 106 presents a plaintext database interface and hides data confidentiality details from the application 102. This client 106 performs query encryption (e.g., using an encryption configuration 110) before sending the request to the EDBMS server 104, and decrypts returning results before forwarding them to the application 102. To implement this functionality, the EDBMS client 106 takes an encryption schema 110 and a client encryption key 112 as input. The EDBMS server 104 includes a trusted module (TM) 114 and a modified (SQL Server) database system 116 (the untrusted module, UM or UMDBMS). For example, the TM 114 and the UM 116 may communicate via PCIe 118. For example, the client device 108 and the UM 116 may communicate via a network 120 (e.g., the Internet). For example, the UM 116 may store data (e.g., database data) in encrypted form in one or more storage devices 122. As shown in the example of FIG. 1, the TM 114 includes one or more stack machines 124 and a TM encryption key 126.

Figure 2:
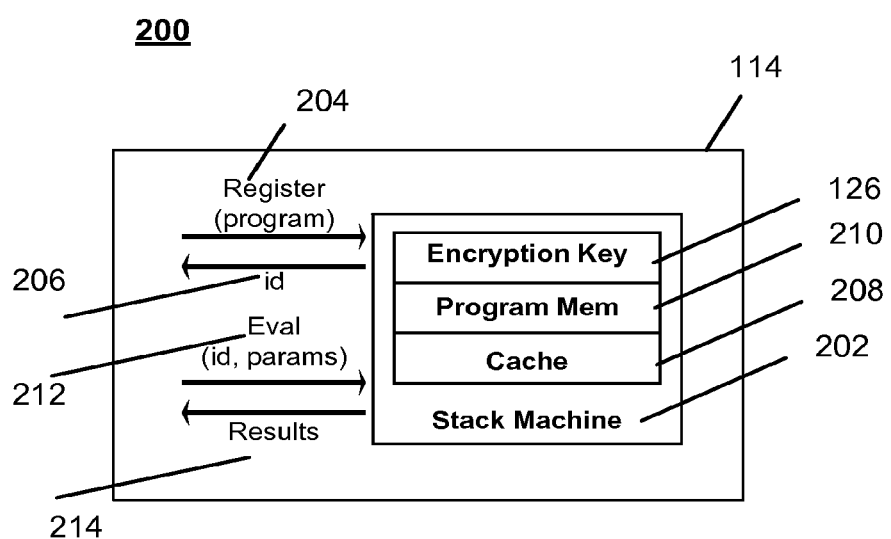
FIG. 2 is a block diagram of an example trusted machine.

FIG. 2 is a block diagram 200 of an example trusted machine (TM) 114. For example, the TM 114 includes a simple stack machine 202 that evaluates stack programs using an instruction set that supports comparison, arithmetic, and cryptographic operations. The TM stack programs are used to evaluate expressions over encrypted data during query processing. For example, a scan-based evaluation of $\sigma_{A=5}(R)$ might use a stack program that inputs an encrypted A value, decrypts it and outputs true if the value is 5 and false otherwise. Such an example stack program may be invoked once for each tuple of R. As this example suggests, the same stack program may be invoked multiple times. To accommodate this usage pattern, a stack program may be registered (204) once and invoked subsequently using the handle 206 returned by a register method. The TM 114 may also support a data cache 208 that may be leveraged for performance. Apart from the data cache 208 and the registered programs (stored in a program memory 210), the TM 114 is stateless. Requests 212 may be invoked by sending the handle and parameters, with results 214 returned. For example, the TM 114 may be realized using FPGA as secure hardware; however, the example structures discussed herein are agnostic to the choice of secure hardware. Further, the TM 114 may be implemented using one or more virtual machines in lieu of hardware.

Figure 3:
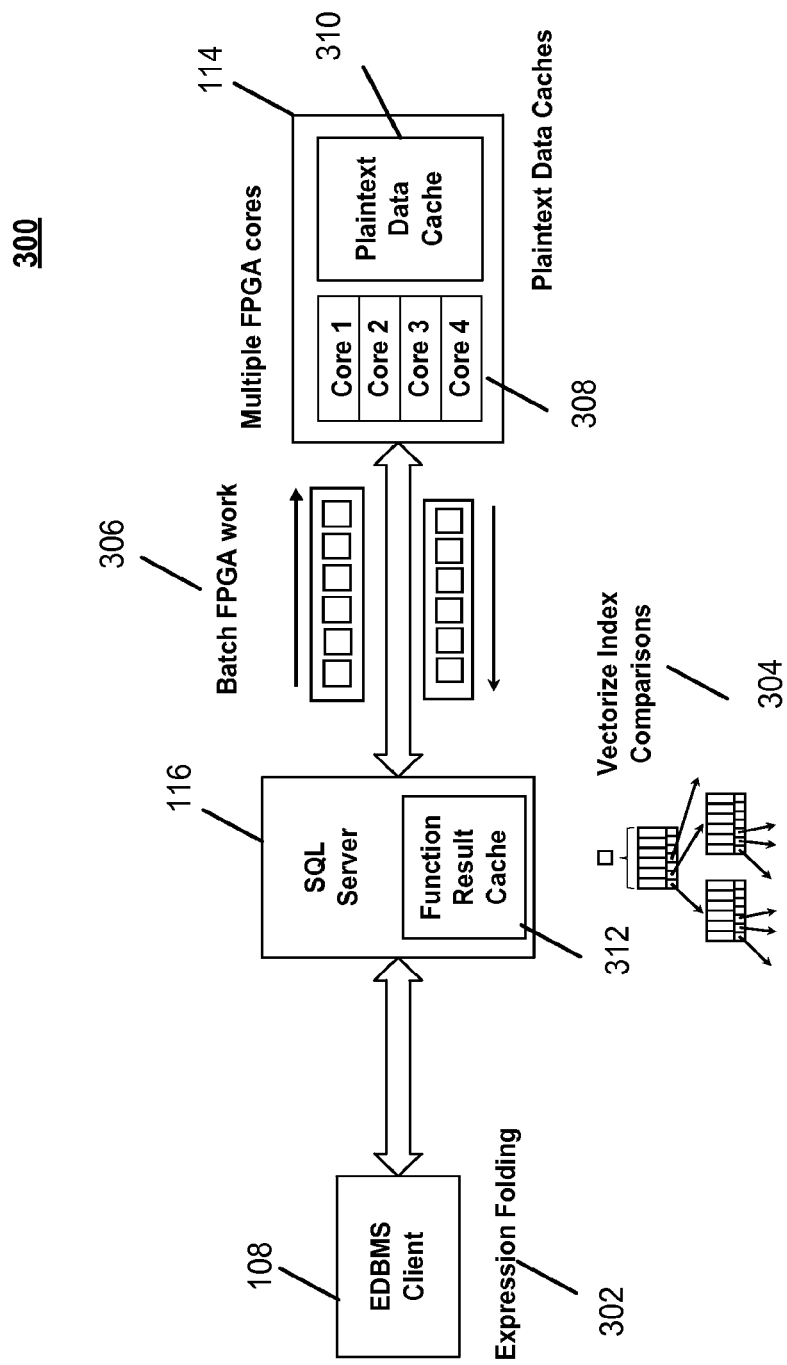
FIG. 3 is a block diagram illustrating example optimization techniques for the system of FIG. 1.

FIG. 3 is a block diagram 300 illustrating example optimization techniques for the system of FIG. 1. For example, as shown in FIG. 3, expression folding 302 may be performed at the EDMS client 108 prior to sending requests to the EDMS server 116. For example, the UM 116 may vectorize index comparisons 304 to minimize a number of round trips of data with the TM 114. For example, the UM 116 may batch FPGA work units 306, at least, to minimize a number of round trips of data with the TM 114.

For example, the TM 114 may include a plurality of cores 308 and one or more data caches 310, at least, to maximize an amount of work done at the TM 114 per transmission from the UM 116, and to minimize the amount of data transmitted (and/or the number of round trips needed between the UM 116 and the TM 114), and to minimize an amount of data to be decrypted (e.g., by minimizing the number of times the same value is decrypted).

For example, the UM 116 may include one or more function result caches 312, as discussed further below.

Generally, in computing, a "cache" is a component that transparently stores data so that future requests for that data can be served faster. For example, the data that is stored within a cache may be values that have been computed earlier or duplicates of original values that are stored elsewhere. If requested data is stored in the cache (cache hit), the request can be served by simply reading the cache, which is comparatively faster. Otherwise (cache miss), the data may need to be recomputed or fetched from its original storage location, which may be comparatively slower. Hence, generally, the greater the number of requests that can be served from the cache, the faster the overall system performance may become.

For example, an UM DBMS 116 may be implemented as a regular database system (e.g., SQL SERVER) that is modified to farm out expression evaluation to the TM 114.

In an example embodiment, a single master key may be used for encrypting the database, relevant portions of the query, and the results. However, the system may also use multiple keys, either derived from one customer's master key or keys for different cloud co-tenants. These keys may be securely communicated to the trusted module using standard key-exchange techniques; the manufacturer of the secure hardware device may assign a public-key identity for running the TM 114.

An example EDBMS may use cell-level encryption for data in the UM 116, such that each column of each record is encrypted independently. For base table columns the encryption scheme may be specified and for derived columns the encryption scheme may be inferred from its lineage. Internally, encrypted data types may be aliased to binary data types, so most of the UMDBMS code may handle these types transparently. For example, cell-level encryption may allow each cell to be accessed independently, potentially minimizing TM traffic during query processing. This example technique may also provide capabilities such that database loading and insertions (when not concerning an index) do not involve the TM. However, cell-level encryption may involve substantial storage overhead for smaller data types: e.g., a 4-byte integer encrypted with AES-CTR may produce a 12-byte ciphertext (with initialization vector inlined). This may be addressed by exploiting the prefix-compressibility of initialization vectors in the CTR mode using SQL SERVER compression features.

Example EDBMSs discussed herein may support equality and range indexes, which differ in terms of supported functionality and confidentiality guarantees. Such example EDBMSs may support indexes over multiple columns and may be primary or secondary, clustered or non-clustered. For example, variants may be implemented using B-trees in the UMDBMS.

Although what is stored for a range index over strongly encrypted columns may be strongly encrypted ciphertext, the indexed keys in the B-tree may be ordered by their plaintext values. When building the index or performing operations such as lookups or updates, comparisons may be routed to the TM 114. For example, the TM 114 may have pre-registered programs that decrypt the provided ciphertext pair and return the comparison result (<, =, >) as plaintext. For example, the TM comparisons during an index build or update may ensure the indexed keys are ordered by their plaintext values.

Figure 4B:
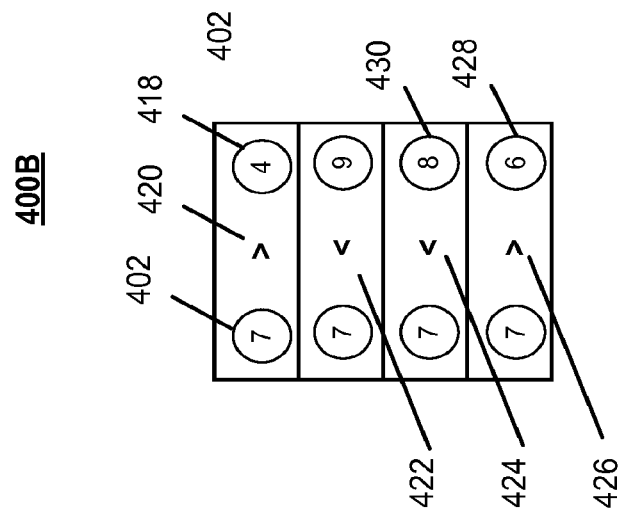
FIGS. 4A-4B are block diagrams of an example range index and example comparisons performed on ciphertext values while inserting a new key.
Figure 4A:
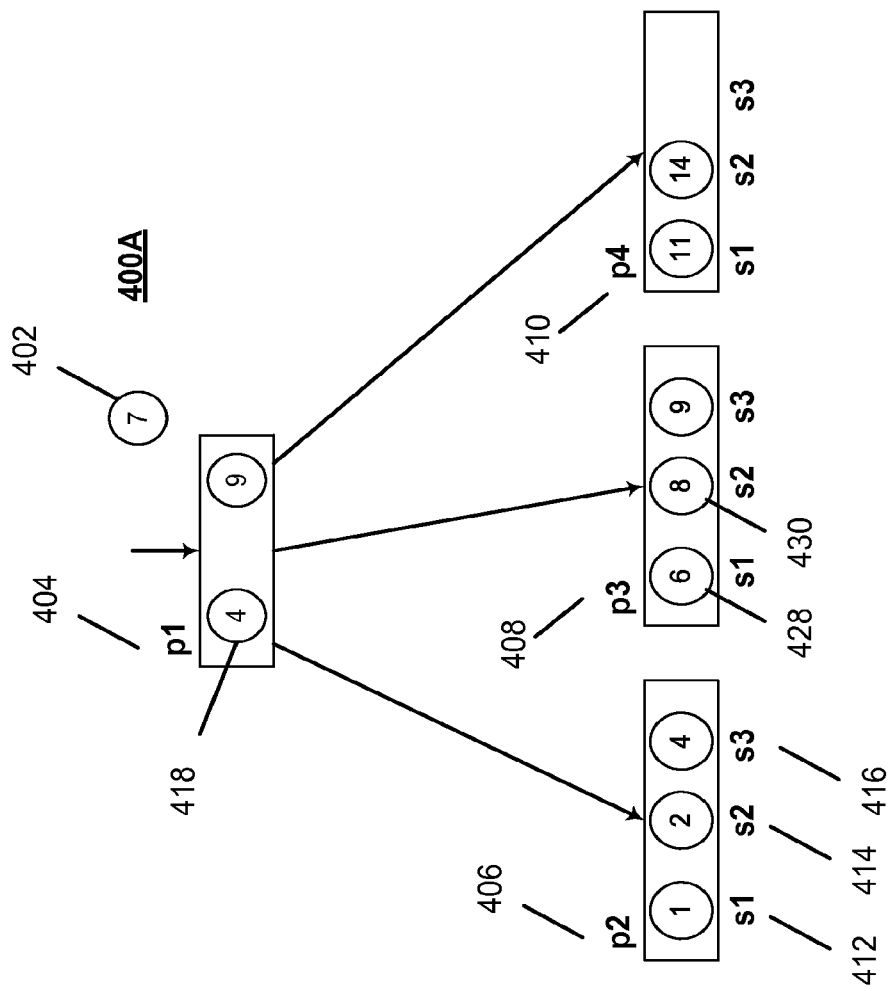

FIGS. 4A-4B are block diagrams of an example range index 400A and example comparisons 400B performed on ciphertext values while inserting a new key 402. The example of FIG. 4A illustrates a single-column range index. In the example of FIG. 4A, strongly encrypted ciphertext is shown using circles over the plaintext (not visible to the adversary). Page ids 404, 406, 408, 410 (p1-p4) and slot ids 412, 414, 416 (s1-s3) within pages are also shown. Also shown are comparisons 400B and their plaintext results while inserting (encrypted) key 7 (402). For example, the key 7 (402) is less than the key 4 (418), with a result 420 of the comparison being ">" as a result. The results (420, 422, 424, 426) of comparisons ensure that key 7 (402) is inserted between keys 6 (428) and 8 (430).

A substantial amount of index processing, including latching/locking for concurrency and managing page splits/merges during updates, remains unchanged, regardless of encryption. Further, since the B-tree is stored in the UM 116 (for this example), a weak adversary may be able to learn the plaintext ordering of indexed keys. However, a weak adversary may not learn equality relationships. For example, in FIG. 4A, the adversary may know that the key stored in slot s1 is ≤the key in slot s2, but may not determine if these two encrypted keys are equal. A strong adversary may learn the equality relationships of keys, but only for the queried ranges.

In this context, a "page" may refer to an object in storage, which may be accessed via a physical storage address. As used herein, a "page" may be associated with a flexible size, and may represent a page unit of storage that may be distributed over multiple discontiguously stored segments of storage. The storage may include volatile and/or stable storage.

As an example, an equality index may be implemented by first deterministically encrypting index keys and then storing them in the range index. Thus, the index keys are stored strongly encrypted, but their relative ordering in the B-tree is determined by their deterministic encryption, and not plaintext values. Using the conjectured pseudo-random permutation properties of standard deterministic encryption schemes, it may be shown that a weak adversary does not learn any ordering or equality information. A strong adversary may learn equality information for the queried portion of the index key space.

In accordance with example optimizations discussed herein, an index lookup may be vectorized and/or batched for an entire page. For example, the input to the TM may comprise one or more pages and the output may comprise the corresponding lowest leaf node for the part of the index tree that has been provided.

In accordance with the example EDBMSs discussed herein, query processing may be performed in two steps: a one-time prepare step, followed by any number of parametrized execution steps. During the prepare step for a query Q, the example EDBMS client 106 may first identify the TM programs that will be used to evaluate expressions in Q and may register these programs with the TM. The example EDBMS client 106 may encrypt the programs to be registered to ensure that an adversary does not learn their details. In particular, a TM program may include internal constants and this may be leveraged to hide query constants. For example, after the TM programs are registered, the example EDBMS client 106 may rewrite Q to reference the program handles returned during registration. An example parametrized query $Q_{ex}$ may be expressed as:

UPDATE Accounts SET Balance=Balance+@Amt

WHERE Id=@Id  (1)

For this example query (1), it is assumed that both Balance and Id columns are strongly encrypted, with an equality index on Id. This query involves a TM program that inputs two strongly encrypted integers and returns the strongly encrypted sum.

In accordance with example techniques discussed herein, a built-in function TMRegister( ) may be added to an EDBMS server (e.g., SQL SERVER) to register stack programs. For this example, it is assumed that 21 is the handle for this program returned by the TM during registration. The original query may thus be rewritten as $Q'_{ex}$:

UPDATE Accounts

SET Balance=TMEval(21,Balance,@Amt)

WHERE Id=@Id                                                                (2)

where TMEval is an example built-in function that may be added to the EDBMS server (e.g., SQL SERVER); for example, TMEval is an n-ary function that invokes a TM stack program. The rewritten query may be PREPAREd in the example EDBMS UM (e.g., SQL SERVER), which compiles and caches the query plan. This example PREPARE step has no knowledge of encryption and may be unmodified SQL SERVER code.

In this example query, assuming an index-based plan, the equality index identifies the record with id equal to the encrypted @Id parameter. The encrypted Balance of this record and the encrypted @Amt parameter may be passed as inputs to TM stack program 21, which returns the encrypted sum of the two, which is used to update the Balance field. For example, this update happens in the UM and the Update operator "thinks" it is replacing one binary value with another.

During query execution, the example EDBMS client 106 may encrypt any query parameters and run the rewritten query at the example EDBMS UM. Query execution at the example EDBMS UM may proceed largely agnostic to encryption, e.g., using unmodified SQL SERVER code except for the two cases discussed above: (1) index lookups over strongly encrypted data involve comparisons in the TM 114 and (2) any calls to the TMEval function may be routed to the TM 114. To the rest of the query processing system, TMEval may look like any other n-ary built-in function.

Partial homomorphic encryption schemes such as OPE or DET encryption can help avoid round-trips to the TM. For instance, in the above example, if the id column is deterministically encrypted, then the index lookup may not involve the TM 114 (e.g., similar to the case when id is in plaintext).

The example EDBMS client 106 may ensure that the output of a TM program is a strongly encrypted value, a cryptographic hash, or a plaintext boolean value. More specifically, the output of a TM program may be plaintext only for boolean operators (equality for joins/group-by and filter predicates), which are consistent with data confidentiality guarantees.

In accordance with example techniques discussed herein, an example minimal TM architecture may advantageously inherit a substantial amount of SQL SERVER concurrency and recovery features without making any encryption-related modifications. For example, SQL SERVER, like many recent databases, uses a combination of latching and locking to ensure physical and logical consistency. These primitives may be acquired on physical structures, even for logical concepts (e.g., physical record address for record level locking), and may work correctly since encrypted data may be simply stored as binary values. One example subtlety relates to key-range locking, where locks may be obtained on leaf-level key values. However, the correctness of this scheme may rely only on the keys being unique (e.g., the ordering information may be implicit in the position of the keys in the B-tree). Since uniqueness may remain unaffected when plaintext keys are replaced with ciphertext values, encryption-specific modifications may not be needed for key-range locking.

The ARIES-style recovery of SQL SERVER relies on physical page-oriented redos and logical undos. The correctness of page-oriented redos relies only on the binary representation of data and is unaffected by encryption. Logical undos may be affected by encryption, but may use the same code path as regular transaction processing. Thus, the query processing modifications discussed above may suffice.

The TM 116 may be considered an abstraction that provides a location for code execution and data that is not accessible to the adversary; an example EDBMS may rely on this abstraction to provide data confidentiality. For example, FPGA-based secure hardware may be used to realize the TM 114, although any type of implementation that provides secure isolation (e.g., memory protection) may be used, including virtual implementations such as HYPERVISOR. There are benefits to using an FPGA as secure hardware in a cloud setting; however, the design of example EDBMSs allows other physical realizations of the TM 114. This flexibility is a consequence of an example minimal TM architecture—e.g., running a TRUSTEDDB style full DBMS on an FPGA may be impractical.

According to example techniques discussed herein, an FPGA platform (e.g., for TM 114) may communicate with a host (e.g., for UM 116) central processing unit (CPU) over a standard PCIe bus 118. Other communication mechanisms exist, such as HYPERTRANSPORT/QPI or deploying an array of FPGAs as a network appliance.

Regardless of the specific platform used, any instantiation of the TM 114 may have performance characteristics that are relevant to the optimizations discussed below, e.g., the bandwidth of communication and latency of round-trip communication between the UM 116 and the TM 114. Since the TM 114 is isolated from the UM 116 (to provide the desired confidentiality guarantees), this may imply data transfer and/or synchronization. Thus, both bandwidth and latency concerns may be likely important considerations to the architecture and may be involved in determining the performance of an overall example system.

Further, some performance characteristics may be specific to a particular FPGA/PCIe platform used for implementation. For example, there may be multiple alternative ways of communicating over PCIe, such as MMIO (memory-mapped I/O) and DMA (direct memory access). For example, MMIO communication may be suitable for very small transfers. For example, DMA may offer substantially improved performance for larger transfers, but may involve non-trivial startup cost. Another potential issue is that FPGAs may be inherently highly parallel, but may have limited sequential compute power. Further, FPGAs may have a small amount of fast on-chip memory and substantially larger, slower off-chip memory (e.g., on the order of a few MBs vs. GBs respectively).

Example techniques discussed herein include an example EDBMS that may farm out expression evaluation over encrypted data to the TM 114. Although expression evaluation may comprise a relatively small part of the processing in a typical DBMS transaction, there may generally be a substantial number of individual expressions and they may be interspersed with other processing, such as obtaining locks and latches, and moving pages to a buffer pool. As an example, the TPC-C NewOrder transaction has more than 1000 distinct expressions, including index comparisons. In an example EDBMS, this may translate to a substantial number of fine-grained TM 114 accesses. For example, each (unoptimized) TM call may involve a relatively small amount of data; e.g., encrypted addition may involve sending 12×2 bytes of input to the TM 114 and receiving 12 bytes of output.

Such tight-coupling of UM processing with TM roundtrips may increase transaction latency as compared to plaintext processing, since, e.g., every TM roundtrip may incur a PCIe transfer latency and because computation performed over encrypted data in the FPGA may be slower than plaintext computations performed locally on the server (116). While adding even a few milliseconds may be acceptable in terms of an individual query's latency (particularly in a cloud setting), added latency in expression evaluation may indirectly reduce throughput.

For example, the TM 114 may be a shared resource in an example EDBMS, and this may affect concurrency and potentially reduce throughput. As an example, a naive implementation may include an FPGA/PCIe subsystem that appears as an undivided shared resource to the rest of the system. For this example, every transaction may involve exclusive access (e.g., using a lock) to make a TM call. If each of 1000 TM calls in the NewOrder transaction takes 10/μsec, using Amdahl's law, the maximum throughput that may be achieved is 100 tps (transaction per second). To achieve higher throughput, concurrent access to the TM 114 may be enabled, and this may be obtained through a combination of parallelism at the FPGA and PCIe communication batching, in accordance with an example technique herein. For example, batching may leverage DMA characteristics by sending and receiving multiple work units in a single communication over the PCIe. In this context, a "work unit" refers to a payload (i.e., input parameters and output result) of a TM call.

For example, increasing TM concurrency may increase the utilization of different components and may expose newer bottlenecks. In this example, the compute resources at the FPGA and the PCIe bandwidth may not form a bottleneck since they are masked by a bigger bottleneck, the PCIe latency. However, the batching optimization may expose these two components as bottlenecks. As more transactions concurrently access the TM 114, data may be transferred and stack programs may be invoked at the FPGA at a higher rate. Various optimizations discussed herein may better utilize resources at these components: for example, data may be cached in the FPGA to reduce PCIe traffic and special instructions may be added to the stack machine to enable computation reuse. These example optimizations may increase the achievable throughput before a component becomes a bottleneck.

Further, the increased latency discussed above may itself reduce throughput since transactions hold on to locks (and sometimes latches) longer, which may increase data contention and reduce throughput. Thus, some example optimizations discussed herein may help in reducing latency.

Example optimizations discussed below may be based on the example principles discussed above. As discussed below, an example optimization may provide more than one benefit; for example, data caching in the FPGA may reduce PCIe bandwidth, while also reducing FPGA computation since cached data may be stored as plaintext (e.g., reducing the need for additional decryption).

As an example, TM 114 parallelism may be increased by utilizing multiple stack machine instances on an FPGA that may be able to process up to n TM calls independently. This example optimization may thus (at least) increase the overall compute resources on an FPGA. For example, parallel processing cores 308 may be feasible since FPGA resources involved for each stack machine is relatively small.

As another example, whenever all stack machines (SMs) 124 are busy, the UM 116 may enqueue transaction work units. When an SM 124 becomes available, queued work units may be sent as a batch (206). A SM 124 may then process the work units in a batch before returning the results (to the UM 116) as a single PCIe communication. In addition to latency advantages based on the non-linear characteristics of DMA transfers discussed above, this example technique may also help to improve throughput, as each SM 124 may be computing for a longer duration, thus minimizing PCIe traffic and freeing the bus 118 for other SMs 124. While this optimization may sometimes increase transaction latency, since a work unit may wait for all other work units in its batch to complete, experimental results have indicated that throughput advantages may outweigh any potential latency penalty. Beyond this, implementing this example optimization may involve (at least) (1) asynchronous communication to enable a single "controller" on the UM 116 to feed multiple TM stack machines 124; (2) techniques to minimize context switches when enqueueing; and (3) switching between DMA and MMIO transfers based on the batch size.

As discussed above, an example EDBMS client 106 may rewrite query expressions involving encrypted data to use the TMEval function, and each invocation of TMEval may translate to a TM 114 call during execution. For example, using expression folding, the EDBMS client 106 (or the UM 116) may fold "adjacent" expressions into a single TMEval call. For example, expression folding may be viewed as intra-transaction batching and may provide benefits similar to those discussed above, including: (1) reduced FPGA computation due to computational reuse; (2) reduced PCIe traffic; and (3) lower transaction latency due to fewer TM calls.

As an example, a query may have two expressions in its UPDATE clause, and all columns may be strongly encrypted. For example, such a query may be expressed as:

UPDATE STOCK

SET s_ytd=s_ytd+@l_qty

SET s_qty=s_qty-@l_qty

WHERE s_id=li_id                (3)

For this example query (3), a naïve execution may be illustrated as:

UPDATE STOCK

SET s_ytd=TMEval(5,s_ytd,@l_qty)

SET s_qty=TMEval(6,s_qty,@l_qty)

WHERE s_id=@li_id                (4)

The naive execution (4) evaluates the two expressions using two TMEval calls (using handle #5 for a stack program to perform an addition of two parameters, and using handle #6 for a stack program to obtain a difference of two parameters).

For the example query (3), an example of expression folding may be illustrated as:

UPDATE STOCK

SET @var0=TMEval(7,s_ytd,s_qty,@l_qty)

SET s_ytd=UMExtract(@var0,0)

SET s_qty=UMExtract(@var0,1)

WHERE s_id=@li_id

The example of expression folding (5) rewrites this to use a single TMEval call. The corresponding example combined stack program (i.e., stack program 7) evaluates both expressions and returns two concatenated encrypted outputs (e.g., concatenated as @var0 for this example), which may be separated in the UM 116 (e.g., using a UMExtract command).

This example expression folding/rewriting, apart from eliminating one TM call and the associated latency, may also provide other benefits. For example, the encrypted parameter @l_qty may be decrypted once and used for both expression evaluations; in the naive rewriting (4) two decryptions may be involved. This type of example technique may be referred to as common sub-expression elimination (CSE). Implementing CSE may involve going beyond a classic stack machine, since it may involve storing expression results outside the stack and referencing them. Further, the parameter @l_qty may be communicated to the TM only once, thereby reducing the consumption of PCIe bandwidth.

The naive (range or equality) index lookups discussed above may invoke a TM 114 call for every comparison. For a 3-level B-tree with 512 index keys per index node, this may translate to 3 $\log_2$ 512=27 calls per lookup. In accordance with example techniques discussed herein, with index lookup vectorization, the search key and a vector of the keys stored in a B-tree node may be passed to the TM 114 in a single call. At the TM 114, a corresponding stack program (e.g., for index lookup) may, for example, perform a binary search over the (sorted) vector, and the position of the search key may be returned. For example, only the keys touched during the binary search may be decrypted, thus potentially substantially reducing the number of key decryptions. Further, sending the vectorized index may substantially reduce the number of TM 114 calls, from 27 to 3 in this example, thus reducing transaction latency. This example technique may also reduce the work done at the TM 114 for this operation, since the search key is only decrypted once and used for all comparisons within a single node. However, this operation may increase the amount of data shipped to the TM 114, from 9+1 keys per node to 512+1 keys for this example. Empirically, however, the benefits may substantially outweigh the disadvantages. Furthermore, data caching, as discussed below, may at least partially address this issue.

As discussed above, FPGAs may have a limited amount of on-chip memory. In accordance with example techniques discussed herein, this memory may be exploited to implement a simple form of data caching, specifically configured to address the data shipping costs of index lookup vectorization. To accomplish this, commonly accessed index key vectors may be identified and cached in plaintext within the FPGA (on-chip memory may not be observed by the adversary, so sending ciphertext that is decrypted and cached inside the FPGA meets confidentiality constraints), for example, in data cache 310. When a B-tree node is encountered that is cached, only the search key and a (single word) handle for the cached vector is sent to the TM. For example, this optimization technique may reduce both the amount of data transferred over PCIe and the work done in the FPGA, since no further decryptions are involved for cached keys.

In accordance with example techniques discussed herein, the available on-chip memory may be divided among different stack machines and the data cache 310 may be replicated at each of them. One skilled in the art of computing will appreciate that other alternatives are also possible.

A TM 114 stack program may be purely functional, in the sense that different invocations of a program with the same encrypted parameters will produce outputs corresponding to the same underlying plaintext (the actual cipher-text output might vary due to non-deterministic encryption). This property may be utilized to implement a function result cache 312 in the UM 116. The function result cache 312 is more general than the data cache 310 and works for all TM 114 programs, not just index-related ones. A function result cache 312 may help avoid TM roundtrips for operations over deterministically encrypted data (other than equality, which does not need the TM 114). However, there may be subtle benefits even for operations over strongly encrypted data. For example, when a lock is not immediately granted in SQL SERVER (which may be relevant during index lookups), an operation can be repeated with the same input ciphertext. Such repetitions may hit in the function result cache 312. Further, strongly encrypted loop counters in stored procedures may start with the same initialization constants and may benefit from a function result cache 312.

Example optimizations discussed herein have been configured to preserve data confidentiality. For example, batching and parallelism within an FPGA do not change the operations being performed. Expression folding may actually slightly increase data confidentiality: for example, when two expressions are folded together, any intermediate data may be kept within the TM 114 where it is invisible to an adversary. With regard to index vectorization, an adversary may learn the same information at every node, whether or not vectorization is used. For data and function result caching, at least as long as the caching strategy only relies on the access patterns of data (information already available to an adversary) and not the index plaintext values, data confidentiality may remain unaffected. However, for example, if cached plaintext index key vectors were compressed, the adversary could learn something based on the aggregate amount of data that is cached.

As discussed above, range indexes may provide substantially the same confidentiality guarantee as OPE for a weak adversary. However, there may be a difference for non-clustered indexes which the following example clarifies.

For example, assume a table T (A, B) exists, and that there is a clustered index on column A and a non-clustered index on column B. In SQLSERVER, the non-clustered index may store the corresponding key value of the clustered index as a RID column. As previously mentioned, the clustered index on A may leak the full ordering of the A column. However, the A values stored in the non-clustered index may be re-encrypted to avoid revealing the corresponding correlation with the clustered index. This may not be done in a system without secure hardware and any software based OPE scheme may in addition reveal the correlations between the non-clustered and clustered indexes.

OPE based implementations may offer an advantage that they can avoid roundtrips to hardware. As the discussion of experimental results indicates, using deterministic encryption for the ID columns may lead to improved performance when compared to using equality indexes.

Table 3 below illustrates FPGA resource needs indicated in experimental results.

TABLE 3

|  | LUTs | FF | BRAM | DSP48 |
|---|---|---|---|---|
| Full System | 59788 (39.7%) | 35909 (11.9%) | 314 (75.5%) | 40 (5.2%) |
| PCIe Infrast. | 46388 (30.8%) | 21068 (7.0%) | 230 (55.3%) | 0 (0.0%) |
| 4x DB Proc | 13400 (8.9%) | 14840 (4.9%) | 84 (20.2%) | 40 (5.2%) |

Example FPGA resource needs for a four-core TM as used for experimental results discussed herein are shown in Table 3. The number of look-up tables, flip-flops, and multipliers (LUTs, FFs, and DSP48s are fundamental logic elements) needed for all four cores was less than 8.9% of those available on the device. In accordance with the experimental results, the most heavily utilized element was block memory (BRAM), with the four TMs using 20.2% of the available memory resources. The PCIe controller represented approximately two-thirds of the overall logic and memory requirements.

The following example illustrates how function caching may help optimize loop counters.

As another example, a stored procedure fragment may include code that inserts a set of values into a table and one of the columns in the table may be updated to the value of a loop variable (@li_no), as shown below:

```
DECLARE @li_no int = 0
WHILE (...)
{
    SELECT @li_no = @li_no + 1
    INSERT INTO OrderLines (. . ., @li_no, ...)
}
```
(6)

If the corresponding column is encrypted then the loop variable also needs to be encrypted to ensure that the stored procedure typechecks. A rewritten stored procedure is shown below; the addition on the encrypted data is performed by calling TMEval with an appropriate program (the program handle is 5 for this example). For this version of the stored procedure, each addition in the while loop may involve a roundtrip to the TM 114.

```
DECLARE @li_no AESCBCInt = 0x22c3cf29
WHILE (...)
{
    SELECT @li_no = TMEval (5, @li_no, 0x33cb7cc)
    INSERT INTO OrderLines (. . ., @li_no, ...)
}
```
(7)

The stored procedure logic is substantially identical for every invocation (including the initial constants). If the result of addition is cached for each encrypted input for the first transaction, then every subsequent invocation of the stored procedure that runs through the same logic can first check the cache and completely skip the roundtrip to TM 114 if there is a hit.

The discussion above regarding query evaluation illustrated an example corresponding rewritten query (augmented with TMEval calls) that is sent to the server 116; however, the format of the discussion herein is provided for clarity of presentation. For example, an EDBMS client 108 may, in accordance with an example embodiment, actually send a query plan to the server 116. For example, the EDBMS may advantageously use a query plan based API for several reasons. For example, the security offered by the system is operational and thus, a function of the query plan.

This API enables the user to pick a plan that is appropriate. As another example, using a query plan based API may simplify query optimization which occurs at the client 108 using statistics on plaintext.

A brief description of some example functionality and example optimizations as discussed herein, is illustrated in Table 4 below.

TABLE 4

| Feature | Client | UMDBMS (SQL SERVER) | TM (FPGA) |
|---|---|---|---|
| Basic Functionality | Compile, register stack programs Query rewrite, PREPARE Encrypt parameters | QE: Functions TMEval & TMRegister SE: Send index comparisons & SARGable predicates to TM | Stack machine |
| FPGA Parallelism Work unit batching | | TMM: Route work to different SMs TMM: Queueing, batching work units | Replicate stack machines Batched SM input and output |
| Index vectorization | | SE: Batched search at B-tree node level | Binary search instruction |
| Expression folding | Compile Multi-expressions Identify common sub-expressions | | Scratch for temp results Instr. to reference temp results |
| Data caching | | TMM: Cache update policy TMM: Replace cached parameters with refs | API to update cache Instruction to reference cache data |
| Function result caching | | TMM: Function result cache lookup/update | |

In the example summary of hardware-software codesign shown in Table 4 above, for the DBMS untrusted device (UMDBMS) column, SE represents a storage engine, QE represents a query engine, and TMM represents a TM 114 manager. One skilled in the art of computing will understand that other configurations may be implemented, without departing from the spirit of the discussion herein.

In accordance with an example implementation, a CIPHERBASE client 106 may include a small C# library that may rely on a SQL parsing library for query rewriting and identifying expressions. It may also include a simple compiler to generate TM 114 stack programs for single and folded expressions, and code for identifying common sub-expressions and performing simple type inferencing used to determine the encryption scheme for various query identifiers.

In accordance with an example implementation, UMDBMS (or untrusted device 116) may include a TM manager to handle communication with the TM 114. For example, the TM manager may reside within a "SQL OS" layer that provides low-level primitives to the rest of the SQL SERVER code. Many of the optimizations discussed above may also be implemented within the TM manager, including batching, routing work to different stack machines, and managing the function result/data cache.

In accordance with an example implementation, external to TM manager, some parts of the SQL SERVER storage engine may handle index vectorization and route SARGable predicate evaluations to the TM 114. For example, an existing SQL SERVER may be modified by adding the TMEval function, which may hide the details of TM calls from the rest of the query engine. For example, other modifications may include handling of non index-nested loop joins and grouping. External to the TM manager, modifications to existing SQL SERVER code may be fairly modest (e.g., less than 1000 lines of code); however, changes may span multiple layers of the stack spread over millions of lines of C++ code.

In accordance with an example implementation, the TM 114 (FPGA) may be realized using a XILINX VIRTEX 6 FPGA board (XC6VLX240T). For example, at least four stack machines may be programmed on the board, for example, each clocked at 150 MHz and with a data cache of 64 KB. For example, the four stack machines and 64 KB cache may be a skyline point: increasing the number of stack machine may decrease the available cache, and vice-versa. The specific numbers discussed herein are in accordance with experimental results. As summarized in Table 4 above, some of the example optimizations may involve modifications to the hardware. For example, such modifications may include new instructions for optimizations such as index vectorization, an out-of-stack scratch memory to enable shared computations, and a data cache. In accordance with some experimental results, an example hardware implementation involved around 6000 lines of VERILOG.

In accordance with an example implementation, for UM 104 hardware, experimental results included testing performed on a dual-processor, 16-core INTEL XEON E5-2640v2 server with dual banks of 32 GB quad-channel DDR3 memory. For example, the FPGA board may be connected to the server via x4 PCIe v2.0.

Discussed below is an example experimental comparison of performance of production SQL SERVER operating on plaintext TPC-C data with CIPHERBASE operating on TPC-C data encrypted using the following policies.

In accordance with an example implementation, for a customer, personally identifiable information (PII) columns in a Customer table (all columns except C_ID) may be strongly encrypted. All other columns may be in plaintext.

In accordance with an example implementation, for Strong/Weak, index key columns and foreign key columns that reference them may be encrypted using deterministic encryption. All other columns may be strongly encrypted.

In accordance with an example implementation, for Strong/Strong, all columns may be strongly encrypted.

As discussed above, the encryption policy may determine the protection that is obtained against a weak adversary. With regard to the Customer policy, keeping PII data confidential may be required for compliance reasons (e.g., HIPAA). However, identifying PII columns might not be straightforward, so schemes that keep all columns encrypted such as Strong/Weak and Strong/Strong may be desirable. Example Strong/Weak policies may keep index columns encrypted using deterministic encryption, so equality index lookups may not involve roundtrips to the TM 114; Strong/Strong may involve roundtrips for substantially all operations. The relative performance of an example EDBMS in accordance with the discussion herein on these policies may therefore help separate the overhead of indexing and non-indexing operations for strongly encrypted data. Strong/Weak may reveal the join graph of tables related by referential integrity to the weak adversary, and this level of data confidentiality may be sufficient for many transactional applications. Further, Strong/Strong may represent an example upper limit of (operational) data confidentiality and competitive performance with strong/strong may simplify physical design, obviating a potential need to identify a suitable encryption policy for each column.

An example experimental evaluation discussed below involved transactions from the TPC-C benchmark. The example experimental evaluation is not a complete run of the TPC-C benchmark and in particular the following simplifications were used. For example, a mix of the NewOrder, OrderStatus and Payment transactions were run with the same relative distribution as the original benchmark. For example, these transactions may account for nearly 90% of the transactions in the original benchmark and may have stringent response time and consistency requirements. It was assumed that the data is completely cached in memory and as a result the parameter W (the number of warehouses) was varied from 10 to 100. For example, a driver was used that runs a number of workers continuously issuing transactions. For example, the throughput was measured by averaging multiple one-minute runs with checkpointing turned off.

For example, these experiments involved varying the workers (N) from 10 to 500 and a particular data point (W=10, N=100) was selected for discussion purposes herein.

Figure 12:
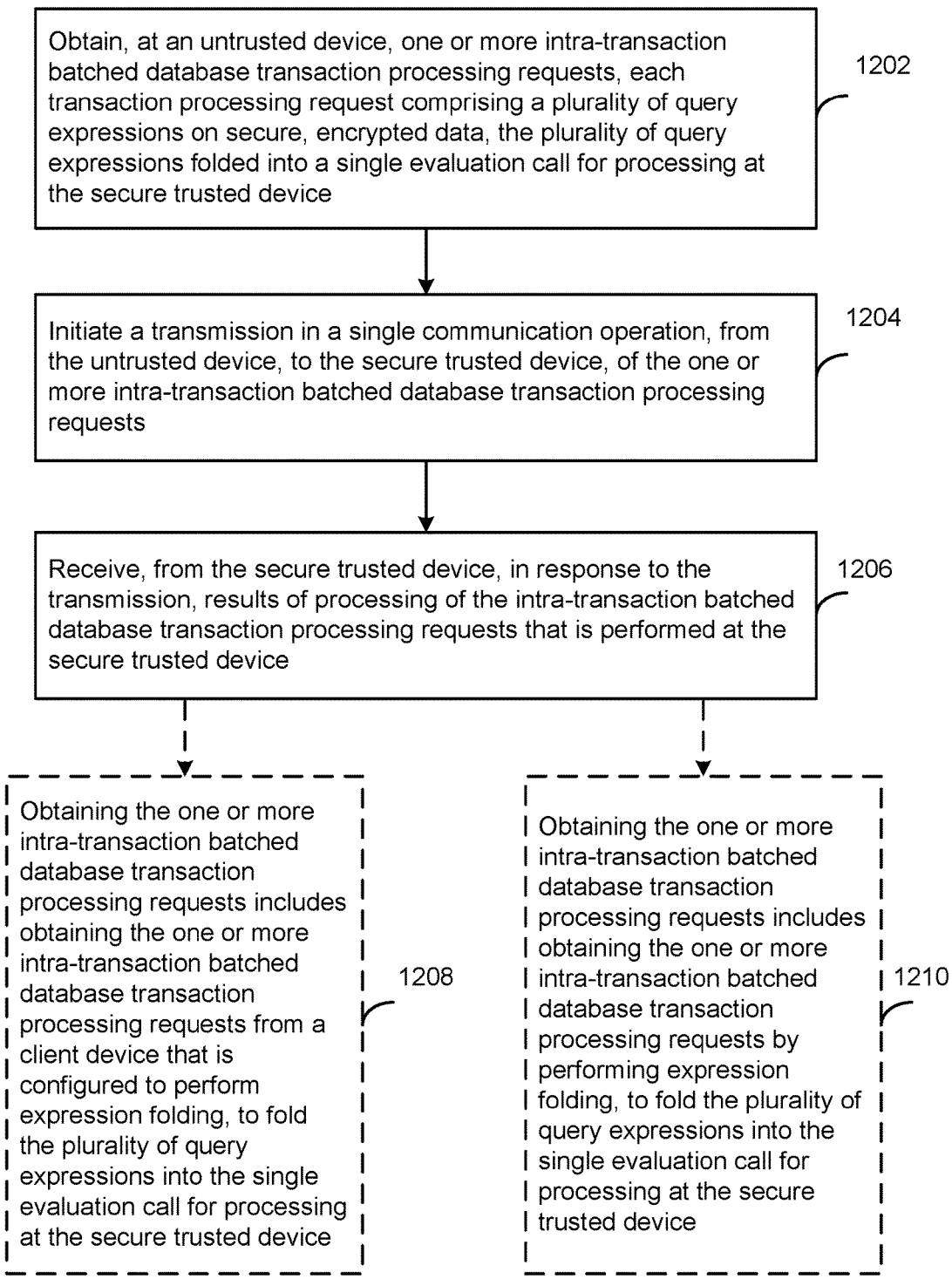
FIG. 12 is a flowchart illustrating example operations of the system of FIG. 9.

FIG. 12 shows CIPHERBASE throughput for the three encryption schemes, normalized to SQL Server plaintext throughput. (We show normalized throughput since Microsoft policy does not allow publication of absolute numbers.)

In accordance with example experimental results (indicating normalized throughput (i.e., normalized to SQL SERVER plaintext throughput), and not absolute numbers), with all optimizations turned on, an example CIPHERBASE implementation achieved 90% of the plaintext throughput for the Customer policy and around 80% for Strong/Weak. When all the columns were strongly encrypted and every data operation needs to go through the TM 114, an example CIPHERBASE implementation achieved 40% of plaintext throughput. Thus, it may be advantageous to have in-server secure hardware.

Experimental results indicated that the example optimizations discussed above may provide about 33% throughput improvement for Customer, about 50% improvement for Strong/Weak, and about a factor 2 improvement for Strong/Strong.

Table 5 below illustrates a number of distinct roundtrips and the number of bytes sent to the TM 114 for each policy, in accordance with experimental results discussed herein.

TABLE 5

|  | Round Trips per Xact | Bytes Transferred per Xact |
|---|---|---|
| Customer (No Opt) | 13.96 | 898.54 |
| Customer (Opt) | 11.76 | 842.2 |
| Strong/Weak (No Opt) | 57.80 | 2248.12 |
| Strong/Weak (Opt) | 6.68 | 1066.95 |
| Strong/Strong (No Opt) | 522.69 | 19501.21 |
| Strong/Strong (Opt) | 89.05 | 122176.3 |

For example, in accordance with experimental results discussed herein, (1) the number of round trips and amount of data sent may increase with the strength of the encryption policy; (2) the example optimizations may substantially reduce the number of round trips for Strong/Weak and Strong/Strong; and (3) while the example optimizations may reduce the number of bytes sent for Customer and Strong/Weak, they may increase the data sent for Strong/Strong, since vectorization may be used to navigate B-Trees. However, even though a larger number of bytes is sent, there may still be substantial benefits in terms of throughput since reducing the number of round-trips may be desirable.

An example implementation of CIPHERBASE may involve potential bottlenecks, for example, (a) data contention from concurrent accesses to shared data, (b) the bandwidth of the PCIe bus, and (c) the computational power of the trusted hardware.

Table 6 below illustrates an example utilization of the PCIe bus 118.

TABLE 6

|  | Bytes/sec |
|---|---|
| Customer | 3.5 MB |
| Strong/Weak | 3.2 MB |
| Strong/Strong | 169.57 MB |

For example, while a theoretical PCIe bandwidth of an example machine may be 2 GB per second, in accordance with experimental results discussed herein, the maximum PCIe utilization for any policy was less than 9%. Likewise, the utilization of the FPGA stack machines was less than 10%.

Table 7 below illustrates an example latency of the TPC-C transactions, measured over all transactions, in accordance with experimental results discussed herein.

TABLE 7

|  | Median | 90$^{th}$ Percentile |
|---|---|---|
| Plaintext | 7 msec | 29 msec |
| Customer | 8 msec | 30 msec |
| Strong/Weak | 11 msec | 31 msec |
| Strong/Strong | 51 msec | 151 msec |

Table 7 indicates an example median and 90th percentile latency. While the latency of an example implementation of CIPHERBASE may increase with the strength of encryption, even with the Strong/Strong database, the end to end latency may be considered as reasonable (e.g., less than 200 msecs). The end-to-end latency requirement of the TPC-C benchmark is 5 seconds for the 90th percentile, an SLA substantially met by even the Strong/Strong database.

The example encryption policies discussed herein may involve operations over strongly encrypted data. As such, they may not be supported by pure PHE-based systems (e.g., CRYPTDB). Specifically, the TPC-C benchmark involves operations such as both additions and multiplications on the same column data, string concatenations, and substring operations; current practical PHE schemes may not support these operations. Thus, some current DBMS implementations may not support, without reducing data confidentiality, a stored-procedure based implementation of TPCC that involves a single client-server roundtrip per transaction. These limitations could be overcome by an implementation that makes one client roundtrip for each SQL statement in a transaction. However, a stored-procedure implementation may be advisable for high-performance; the TPC-C results of some vendors have used stored procedures. Even with this multi-roundtrip implementation, the performance for Strong/Strong may fail, since this policy precludes the use of indexes in the server.

As discussed herein, example CIPHERBASE techniques may provide operational data confidentiality for a strong adversary. Such example features may be usable and practical for online transaction processing (OLTP) systems for a variety of reasons. First, it may be unrealistic to assume that an adversary can constantly monitor/persist contents of the server's disk/memory for highly concurrent OLTP systems. Thus, in practice an adversary may lie in between the weak and strong adversaries discussed above. Second, weaker encryption schemes may in reality leak less information than assumed based on data characteristics (e.g., using DET encryption for an ID column with a UNIQUE constraint). Third, offering higher security for OLTP systems (where support for indexing may be desirable) may incur substantial overheads. For example, systems that do data shuffling may incur writes even for a read only transaction, which may impact concurrency and overall performance. Such data shuffling may also reduce spatial and temporal locality of reference which may further undermine performance.

In accordance with an example implementation, CIPHERBASE may provide only a 2× slowdown for a policy in which all columns are strongly encrypted for TPC-C. Thus, CIPHERBASE may provide advantageous benefits for OLTP on encrypted data.

Further, security beyond operational guarantees may be feasible for other workload patterns, e.g., online analytical processing (OLAP) queries.

Table 8 below illustrates an example summary of a division of work between an example UMDBMS 116 and a TM 114, in accordance with experimental results discussed herein.

TABLE 8

| Feature | UMDBMS (SQL SERVER) | TM (FPGA) |
|---|---|---|
| SELECT query | Storage engine(I/O, Buffer pool, locking, latching) Query Processing (Operator memory management, spooling, data flow, admission control, inter-query resource governance) | Query expressions (e.g., equality, range comparisons, GetHashCode, Addition, Multiplication, String Concatenation) |
| UPDATE query | All of the above, plus: Data update, Constraint checking, Logging and recovery | Query expressions (e.g., equality, range comparisons, GetHashCode, Addition, Multiplication, String Concatenation) |
| B-Tree Indexing | Page organization, Tree organization, Page splits and merges, Concurrency control (including key value range locking) | Comparison |
| SQL Extensions (e.g., loops, if-then-else) | Program control flow, memory management | Program expressions |

Encryption may increase the space consumed by the database substantially. For example, using the AES-CBC (Cipher-Block Chaining) mode of non-deterministic encryption may expand a 32-bit plaintext to 256 bits of ciphertext.

In accordance with example techniques discussed herein, the Advance Encryption Standard-Counter (AES-CTR) mode of non-deterministic encryption may be used (while Cipher Block Chaining (CBC) mode may also be offered to clients, if desired). For example, the CTR mode is also a standard mode of AES and offers the IND-CPA guarantee discussed above. Further, it may offer advantageous benefits in space consumption. Example intuition behind the space savings follows. First, the CBC mode is a block cipher involving plaintext to be padded to multiples of a fixed block size (128 bits). In contrast, the CTR mode is a stream cipher and therefore may not pad the plaintext. Second, non-deterministic encryption may be realized by incorporating an Initialization Vector (IV) that changes with every input into the encryption function. The CBC mode may involve random generation of the IV. However, CTR mode may only involve uniqueness of the IV (e.g., a nonce).

In an example implementation of CIPHERBASE, a 64-bit counter may be maintained by the TM 114 as the IV. For example, the counter may be incremented with every encryption. Since the IV is sequential, it may lend itself to effective compression using off-the-shelf compression techniques. This may have substantially no impact on the confidentiality, as the compression may be independent of the actual data values.

Table 9 below illustrates space consumed by the Plaintext and Strong/Strong databases with CBC and CTR modes with and without compression for the TPC-C database (with W=10), in accordance with experimental results discussed herein.

TABLE 9

| Encryption Policy | Space Consumed |
| --- | --- |
| Plaintext | 836 MB |
| Strong/Strong (CBC) | 3634 MB |
| Strong/Strong (CTR) | 1427 MB |
| Strong/Strong (CTR) Compressed | 1082 MB |

As indicated by Table 9, the CTR mode with compression consumes only 30% more space than plaintext. However, CBC consumes more than 4× the space consumed by plaintext. These savings may be significant since: (1) clients may pay for space usage in a cloud setting, and (2) the assumption that large databases fit in main memory may not hold in a multi-tenant environment, hence space savings may potentially translate to reduced I/O, and thereby, performance improvement.

Commercially, an example established technique for data security may involve keeping all data encrypted on disk and decrypting as soon as it is loaded into main memory for processing. While this approach may protect the confidentiality of data in the event that disks are stolen, this approach may not be sufficient to protect the confidentiality of the data against attacks from database administrators who have root access to machines. For example, the encryption key may be stored as part of the database and thus, may be easily accessible for a database administrator. Some example systems may address this issue by leveraging trusted hardware (Hardware Security Modules) to securely store keys. However, even if the key is not accessible and the administrator has no permissions to execute queries, the administrator may be able to retrieve confidential data by taking a memory dump of the machine. To protect data from "honest and curious" database administrators, data may be kept encrypted on disk and in main memory.

Some example systems may leverage FPGAs for query processing. For example, a potential focus may be on using FPGAs as accelerators for specific database operators, and certain database operators (e.g., streaming aggregates) may be run in the FPGA. However, example techniques discussed herein may provide 1) encryption as a use case for leveraging FPGAs for query processing and 2) the use of the FPGA as a co-processor which runs only expression evaluation (e.g., query operators may still run in the UM 116). Similar discussion may apply to example systems using graphics processing units (GPUs) to accelerate query processing.

Example techniques discussed herein may provide architectures for building EDBMSs with: 1) a secure hardware based implementation with a minimal TCB, 2) industrial strength transactional functionality with advantageous performance, even when all data stays strongly encrypted throughout the entire stack (e.g., disk, memory and network), and 3) an advantageous example in performance-security work that provides operational guarantees with the flexibility to choose an appropriate encryption policy.

Figure 5:
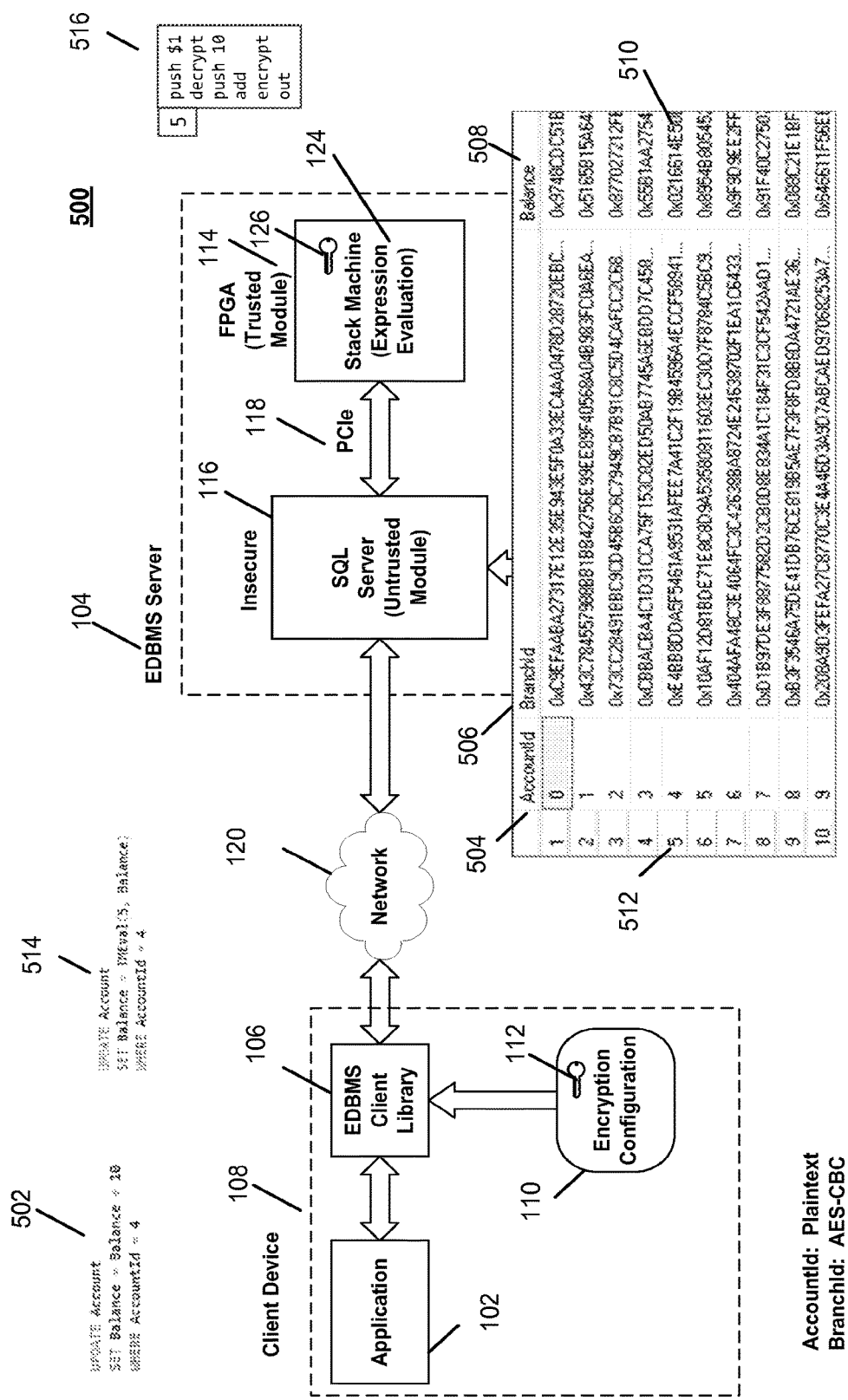
FIG. 5 is a block diagram illustrating an example lifecycle of a query processed by an example EDBMS.

FIG. 5 is a block diagram illustrating an example lifecycle 500 of a query 502 processed by an example EDBMS in accordance with example techniques discussed herein, wherein an AccountID field 504 of the database is stored (at the UM 116) in unencrypted form (plaintext). As shown in FIG. 5, a BranchID field 506 is stored (at the UM 116) in AES-CBC encrypted form, and a Balance field 508 is stored (at the UM 116) in AES-CBC encrypted form. As can be seen in FIG. 5, each of the AccountID field 504, the BranchID field 506, and the Balance field 508 may be viewed as stored in columns, with the AccountID field 504 stored as an unencrypted (plaintext) column.

As shown in FIG. 5, the query 502 requests an UPDATE of "Account" by adding 10 to the "Balance" value for an "AccountID"="4." Thus, the query 502 is requesting that a value of 10 be added to a balance field 510 of a database record 512 having an AccountID value of 4. As discussed above, the data encryption is transparent to the application 102. The EDBMS client library 106 generates a program that takes one encrypted parameter, adds 10, and returns the encrypted result. The EDBMS client library 106 then rewrites the query to reference this program (e.g., via the handle "5"). As shown in FIG. 5, the query 502 is rewritten to a rewritten form 514 at the client 106, with a TMEval statement referencing a stack program 516 at the TM 114, with the stack program 516 having a handle of "5."

Thus, as shown in FIG. 5, when the stack program 516 is executed, the encrypted value of "Balance" (510) for record 512 (with AccountID=4) is pushed onto a stack and decrypted. A value of "10" is then pushed onto the stack, and the two values at the top of the stack are added. The result is encrypted, and the encrypted result is then output from the stack program with handle of 5. The encrypted result may then be sent back to the UM 116.

As discussed above, a substantial portion of the query processing (e.g., indexing, locking, buffering, etc.) may be performed at the untrusted device, e.g., using regular SQL SERVER code.

Figure 6:
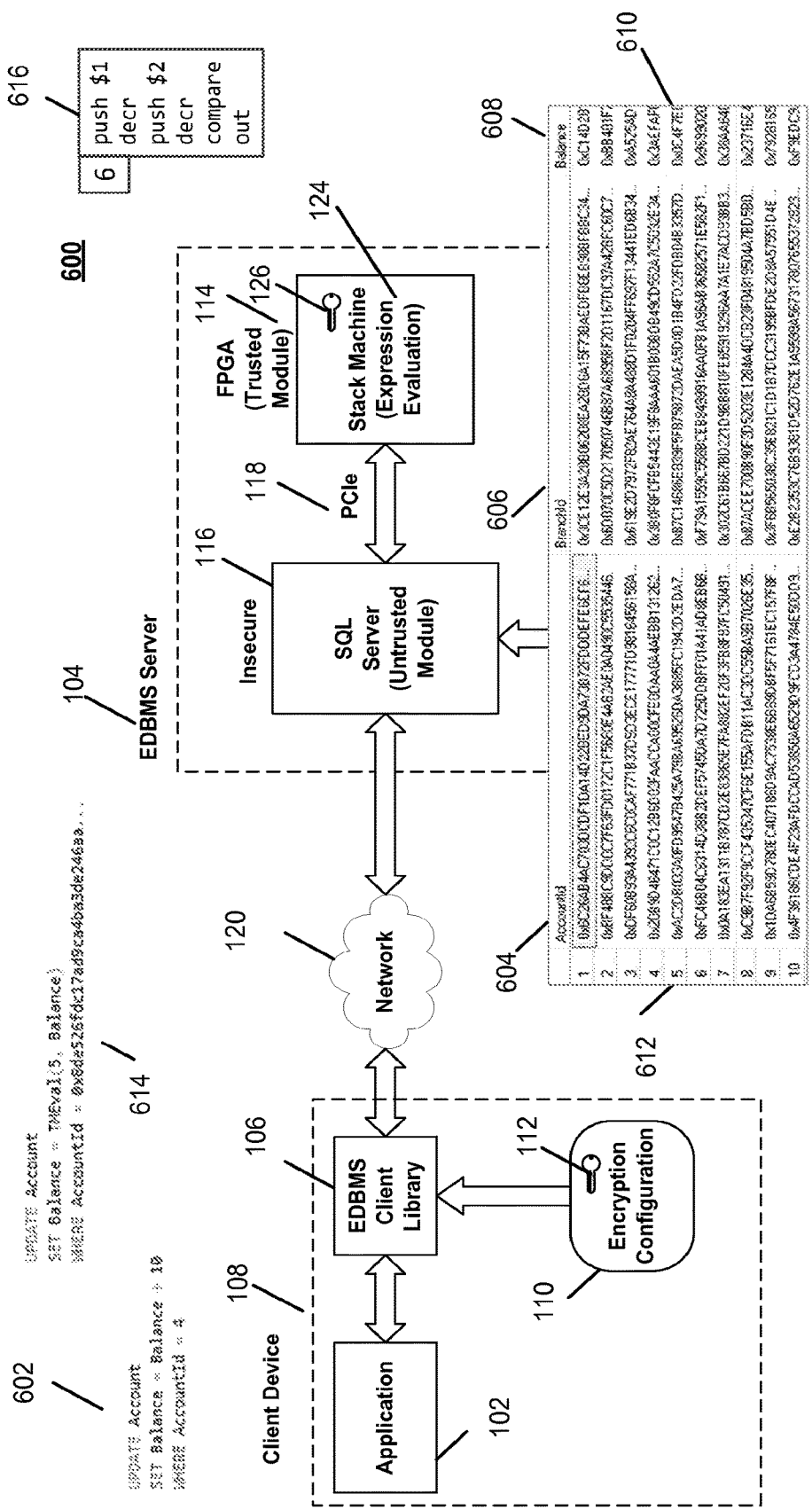
FIG. 6 is a block diagram illustrating an example lifecycle of a query processed by an example EDBMS.

FIG. 6 is a block diagram illustrating an example lifecycle 600 of a query 602 processed by an example EDBMS in accordance with example techniques discussed herein, wherein an AccountID field 604 of the database is stored (at the UM 116) in encrypted form (AES-CBC). As shown in FIG. 6, a BranchID field 606 is stored (at the UM 116) in AES-CBC encrypted form, and a Balance field 608 is stored (at the UM 116) in AES-CBC encrypted form. As can be seen in FIG. 6, each of the AccountID field 604, the BranchID field 606, and the Balance field 608 may be viewed as stored in columns, with the AccountID field 604 stored as an encrypted column.

As shown in FIG. 6, the query 602 requests an UPDATE of "Account" by adding 10 to the "Balance" value for an "AccountID"="4." Thus, the query 502 is requesting that a value of 10 be added to a balance field 610 of a database record 612 having an AccountID value that is an encrypted version of plaintext 4. The EDBMS client library 106 generates a program that takes one encrypted parameter, adds 10, and returns the encrypted result. The EDBMS client library 106 then rewrites the query to reference this program (e.g., via the handle "5"). As shown in FIG. 5, the query 602 is rewritten to a rewritten form 614 at the client 106, with a TMEval statement referencing a stack program 616 at the TM 114, with the stack program 616 having a handle of "5" (as in FIG. 5).

As shown in FIG. 6, an additional stack program 616 is utilized in the FPGA, for comparing two encrypted values. As shown in FIG. 6, when the stack program 616 is executed, a first value is pushed onto a stack and decrypted. A second value is then pushed onto the stack and decrypted. The two decrypted values at the top of the stack are then compared, and a result of the comparison is then output from the stack program 616.

Since the AccountID value that is sent is an encrypted version of plaintext 4, the TM 114 may be able to search an encrypted index by using the comparison of the stack program 616, to find the location of the correct "Balance" for update.

Figure 7:
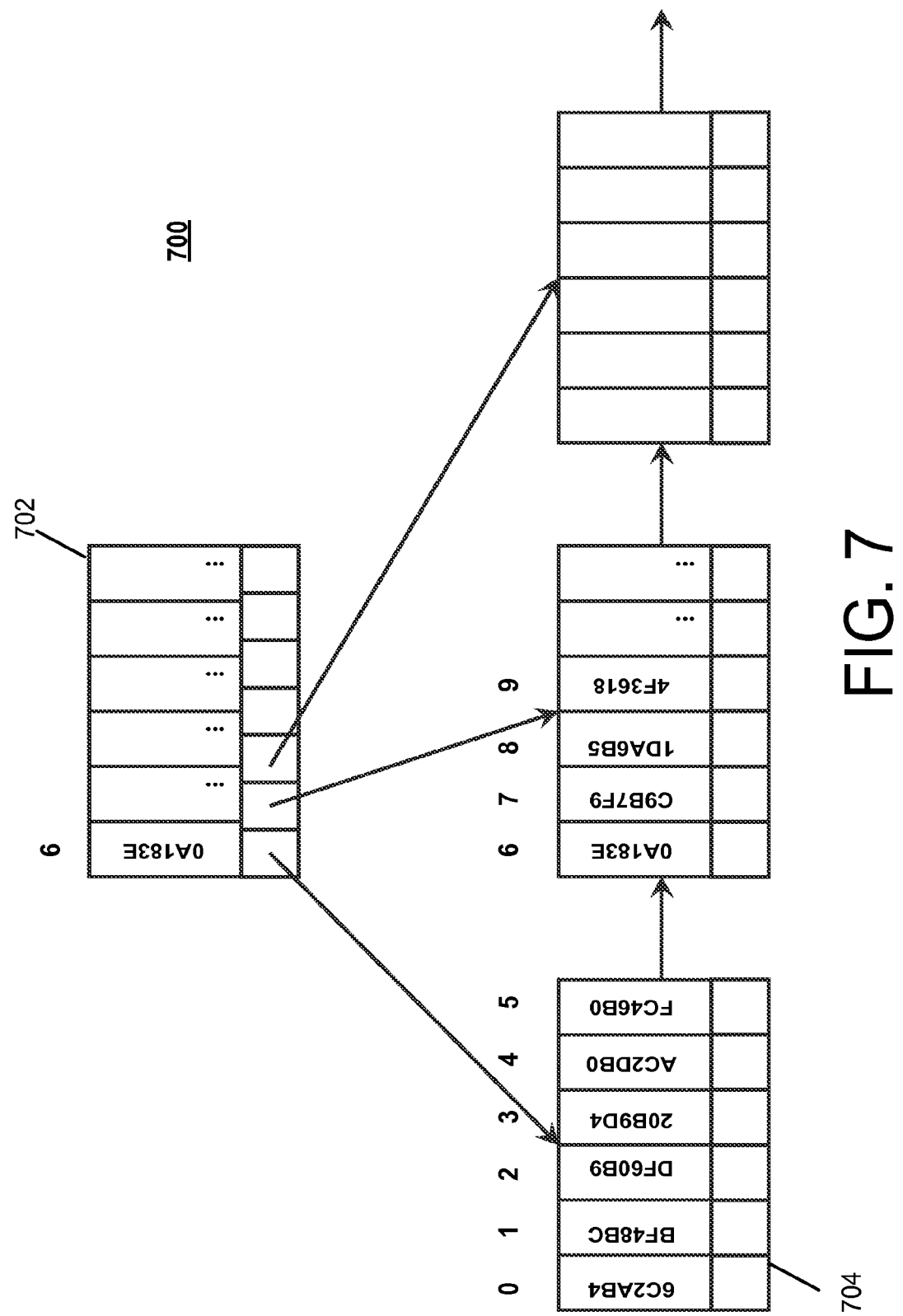
FIG. 7 is a block diagram illustrating an encrypted index for searching.

FIG. 7 is a block diagram illustrating an encrypted index (e.g., a B+-Tree over encrypted data) 700 that may be searched using example techniques discussed herein. As shown in FIG. 7, the encrypted values appear as random values to an adversary—and encryption keys are not stored in the untrusted device 116. For reading convenience herein, decrypted values are shown outside the index cells (but are not actually stored in the structure, in reality). Thus, it can be seen that 6 (unencrypted value of index value) is the first index value in the root node 702, as shown in FIG. 7. Thus, all key values in the leftmost child 704 of the root node 702 are less than (unencrypted) 6, although an adversary may not be able to determine that value, due to the encryption.

Figure 8:
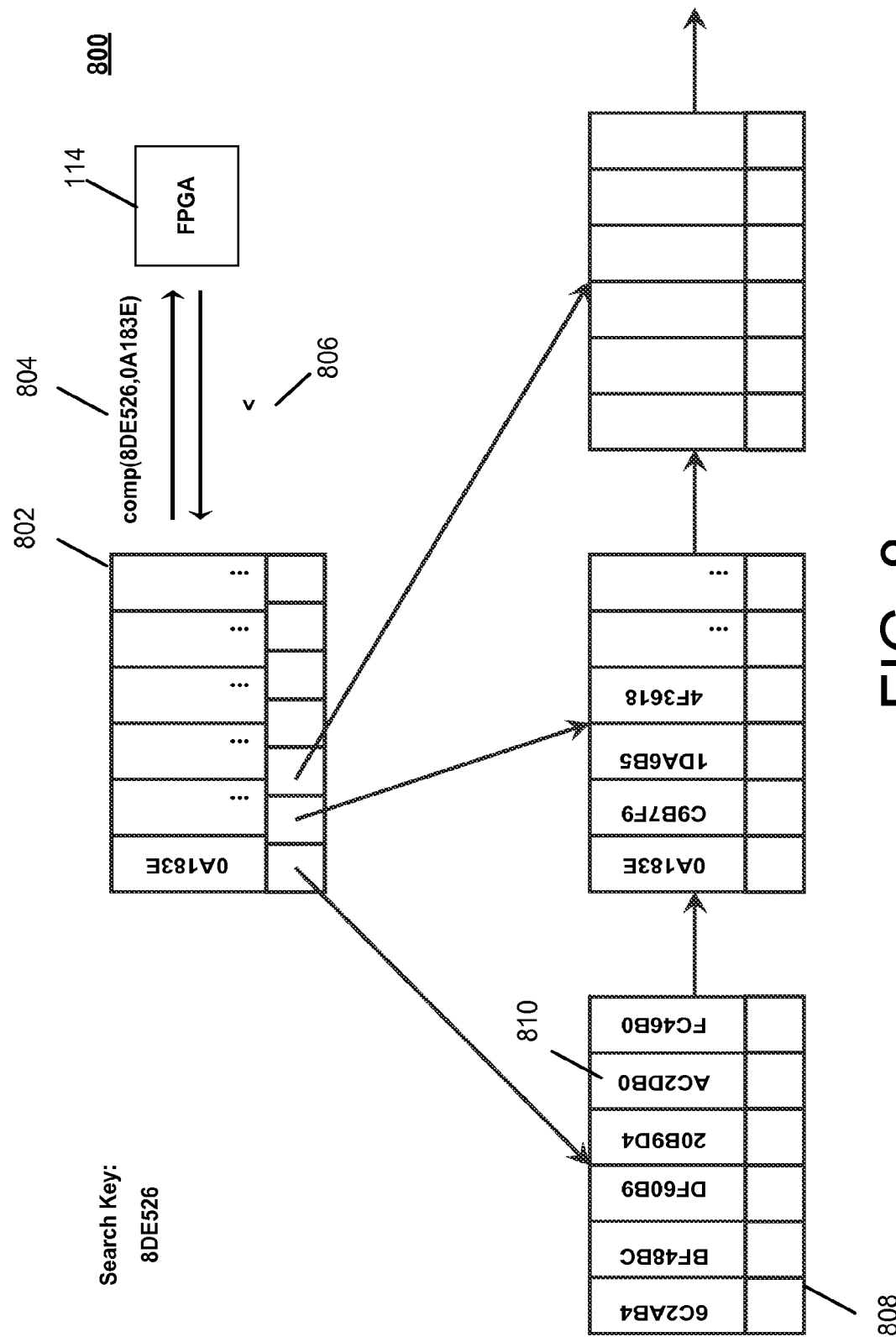
FIG. 8 is a block diagram illustrating an encrypted index for searching.

FIG. 8 is a block diagram illustrating an encrypted index (e.g., a B+-Tree over encrypted data) 800 that may be searched using example techniques discussed herein. As shown in FIG. 8, a search key value "8DE526" is searched in the index 800. As shown in FIG. 8 the first encrypted value in the root node 802 is shown as "0A183E." Thus, the search key value "8DE526" may be compared against the first encrypted value in the root node 802 ("0A183E") by sending the two values to the TM 114 as a request 804 to compare the two encrypted values (e.g., using the example stack program 6 discussed above). As shown in FIG. 8, the comparison returns a result 806 of "<". Thus, the left child 808 of the root node 802 is further traversed until the correct node value (810) is located.

For the example above, encryption is non-deterministic.

One skilled in the art of computing will understand that other instructions or operations may also be used to achieve this (or similar) functionality, without departing from the discussion herein.

II. Example Operating Environment

Features discussed herein are provided as example embodiments that may be implemented in many different ways that may be understood by one of skill in the art of computing, without departing from the discussion herein. Such features are to be construed only as example embodiment features, and are not intended to be construed as limiting to only those detailed descriptions.

FIG. 9 illustrates an example of a suitable computing system environment 900 on which aspects of the subject matter discussed herein may be implemented (e.g., the EDBMS). The computing system environment 900 is only one example of a suitable computing environment and is not intended to suggest any limitation as to the scope of use or functionality of aspects of the subject matter discussed herein. Neither should the computing environment 900 be interpreted as having any dependency or requirement relating to any one or combination of components illustrated in the example operating environment 900. Although not shown in FIG. 9, one or more FPGAs may be utilized for the TM 114. For example, the FPGAs may be physically located on the same hardware as the untrusted device 116, or may be located separately. For example, the FPGAs may communicate with the untrusted device 116 via a PCIe bus, as discussed above.

Although not shown, the TM 114 may be implemented, in whole or in part, via virtual devices (e.g., HYPERVISOR), which may be located in the system 900.

Aspects of the subject matter discussed herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 9, an example system for implementing aspects of the subject matter discussed herein includes a general-purpose computing device in the form of a computer 910. A computer may include any electronic device that is capable of executing an instruction. Components of the computer 910 may include a processing unit 920, a system memory 930, and one or more system buses (represented by system bus 921) that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 920 may be connected to a hardware security device 922. The security device 922 may store and be able to generate cryptographic keys that may be used to secure various aspects of the computer 910. In one embodiment, the security device 922 may comprise a Trusted Platform Module (TPM) chip, TPM Security Device, or the like.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media.

Computer storage media (or "computer-readable storage media") includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs), Blu-ray Disc (BD) or other optical disk storage (e.g., Universal Serial Bus (USB) drive, hard disk drive), magnetic cassettes, magnetic tape, magnetic disk storage or other magnetic storage devices, or any other medium which can be used to store the desired information and which can be accessed by the computer 910. "Computer storage media" does not include "communication media." Thus, as used herein, the term "computer-readable storage medium" is not a signal per se, nor any type of propagating signal per se.

"Communication media" typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 930 may include computer storage media in the form of volatile and/or nonvolatile memory such as read only memory (ROM) 931 and random access memory (RAM) 932. Nonvolatile memory may be substituted for some or all of the ROM 931 and/or the RAM 932. For example, memristor memory, phase-change memory (PCM), or some other type of nonvolatile memory may be used instead of, or in addition to, the ROM 931 and/or the RAM 932.

A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disc drive 955 that reads from or writes to a removable, nonvolatile optical disc 956 such as a CD ROM, DVD, BD, or other optical media.

In one implementation, memristor memory, phase-change memory, or some other type of nonvolatile memory may be used instead of, or in addition to, the hard drive 941.

Other removable/non-removable, volatile/nonvolatile computer storage media (or "computer-readable storage media") that can be used in the exemplary operating environment include magnetic tape cassettes, flash memory cards and other solid state storage devices, digital versatile discs, other optical discs, digital video tape, solid state RAM, solid state ROM, and the like. The hard disk drive 941 may be connected to the system bus 921 through the interface 940, and magnetic disk drive 951 and optical disc drive 955 may be connected to the system bus 921 by an interface for removable nonvolatile memory such as the interface 950.

The drives and their associated computer storage media, discussed above and illustrated in FIG. 9, provide storage of computer-readable instructions, data structures, program modules, and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers herein to illustrate that they may be different copies.

A user may enter commands and information into the computer 910 through input devices such as a keyboard 962 and pointing device 961, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 920 through a user input interface 960 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include phone networks, near field networks, and other networks. Such networking environments are commonplace in offices, enterprise-wide computer networks, intranets, and the Internet.

When used in a LAN networking environment, the computer 910 is connected to the LAN 971 through a network interface or adapter 970. When used in a WAN networking environment, the computer 910 may include a modem 972 or other means for establishing communications over the WAN 973, such as the Internet. The modem 972, which may be internal or external, may be connected to the system bus 921 via the user input interface 960 or other appropriate mechanism. In a networked environment, program modules depicted relative to the computer 910, or portions thereof, may be stored in the remote memory storage device. By way of example, and not limitation, FIG. 9 illustrates remote application programs (RAP) 985 as residing on memory device 981. It will be appreciated that the network connections shown are exemplary and other means of establishing a communications link between the computers may be used.

In this context, a "processor" may include a single processor or multiple processors configured to process instructions associated with a computing system. A processor may thus include one or more processors executing instructions in parallel and/or in a distributed manner. For example, the system shown in FIG. 9 may include one or more processors (e.g., hardware processors).

For example, a system may include at least one hardware device processor, and a computer-readable storage medium storing executable instructions for execution by the device processor, for implementing an EDBMS as discussed herein and/or for implementing a client device as discussed above.

For example, the trusted module 114 and the untrusted module 116 may include one or more of the modules discussed above with regard to FIG. 9. For example, the client device 108 may include modules as discussed above with regard to FIG. 9.

One skilled in the art of computing will appreciate that many different techniques may be used for implementing features discussed herein.

III. Flowchart Description

Features discussed herein are provided as example embodiments that may be implemented in many different ways that may be understood by one of skill in the art of computing, without departing from the discussion herein. Such features are to be construed only as example embodiment features, and are not intended to be construed as limiting to only those detailed descriptions.

Figure 10A:
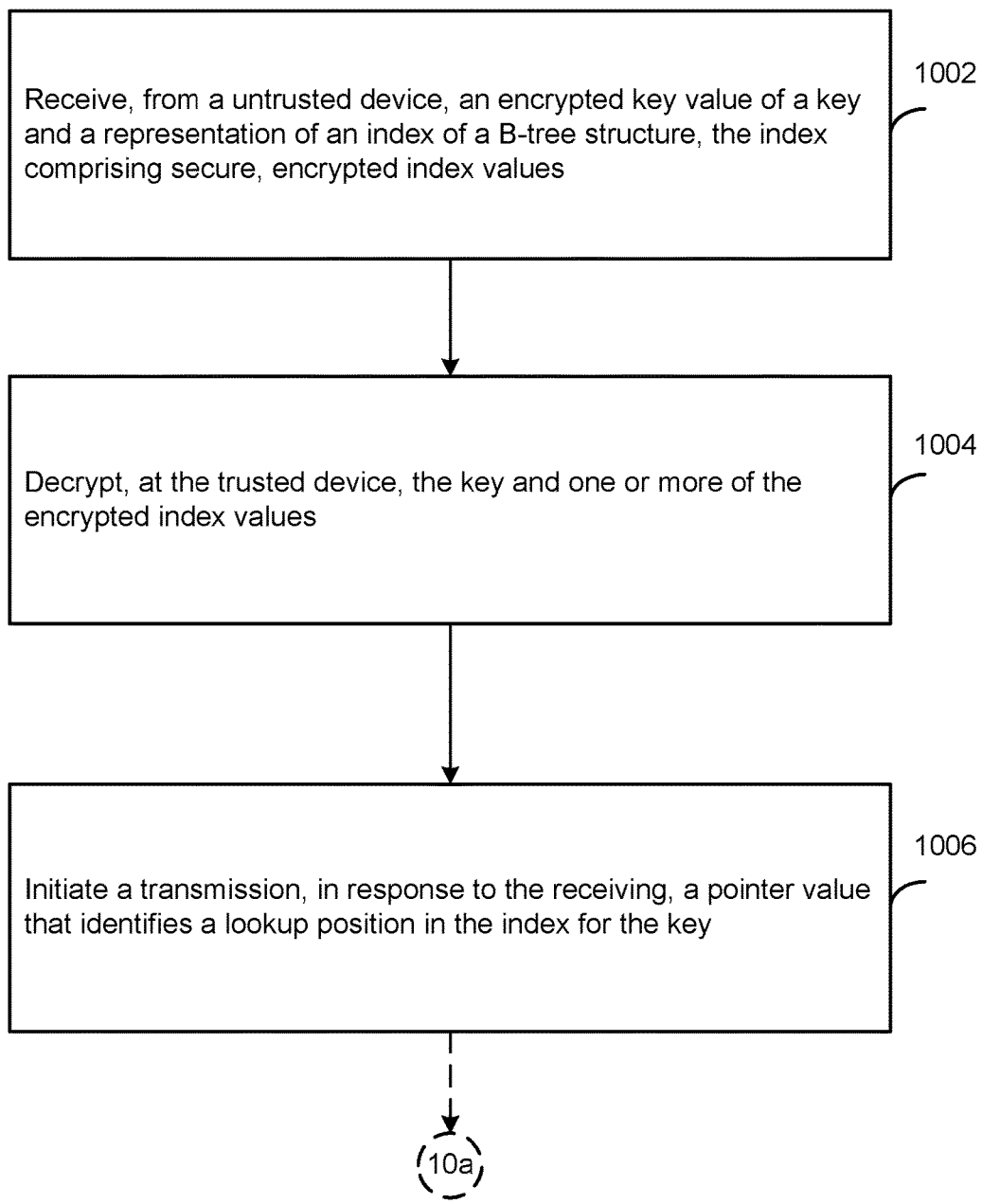
FIGS. 10A-10D are a flowchart illustrating example operations of the system of FIG. 9.

FIGS. 10A-10D are a flowchart illustrating example operations of the system of FIG. 9, according to example embodiments. As shown in the example of FIG. 10A, an encrypted key value of a key and a representation of an index of a B-tree structure is received at a trusted device, from an untrusted device, the index comprising secure, encrypted index values (1002).

The key and one or more of the encrypted index values are decrypted, at the trusted device (1004).

In response to the receiving, a transmission of a pointer value that identifies a lookup position in the index for the key is initiated (1006).

Figure 10B:
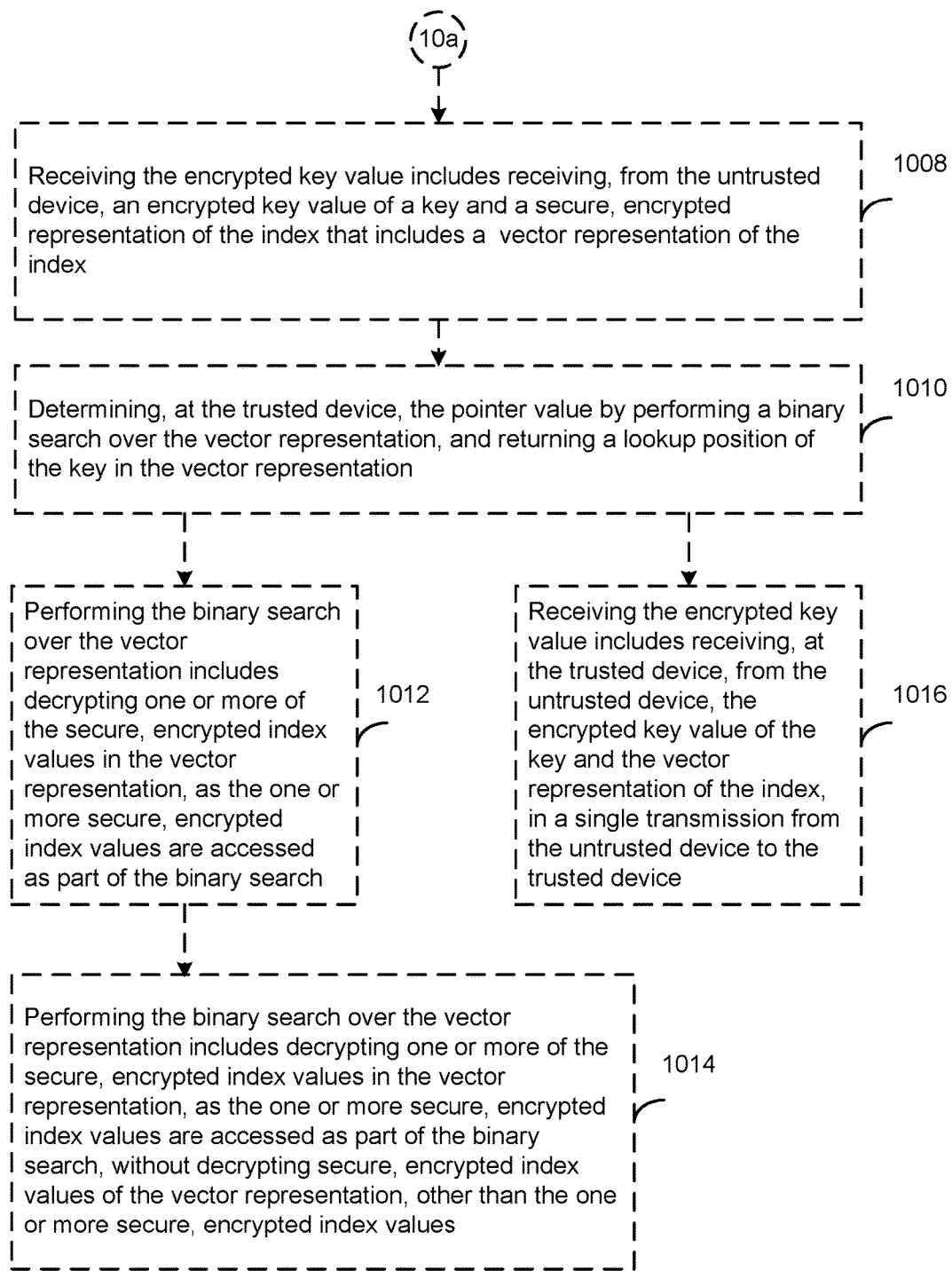

For example, receiving the encrypted key value may include receiving, from the untrusted device, an encrypted key value of a key and a secure, encrypted representation of the index that includes a vector representation of the index (1008), as shown in FIG. 10B.

For example, the pointer value may be determined, at the trusted device, by performing a binary search over the vector representation, and returning a lookup position of the key in the vector representation (1010).

For example, performing the binary search over the vector representation may include decrypting one or more of the secure, encrypted index values in the vector representation, as the one or more secure, encrypted index values are accessed as part of the binary search (1012).

For example, performing the binary search over the vector representation may include decrypting one or more of the secure, encrypted index values in the vector representation, as the one or more secure, encrypted index values are accessed as part of the binary search, without decrypting secure, encrypted index values of the vector representation, other than the one or more secure, encrypted index values (1014).

For example, receiving the encrypted key value may include receiving, at the trusted device, from the untrusted device, the encrypted key value of the key and the vector representation of the index, in a single transmission from the untrusted device to the trusted device (1016).

Figure 10C:
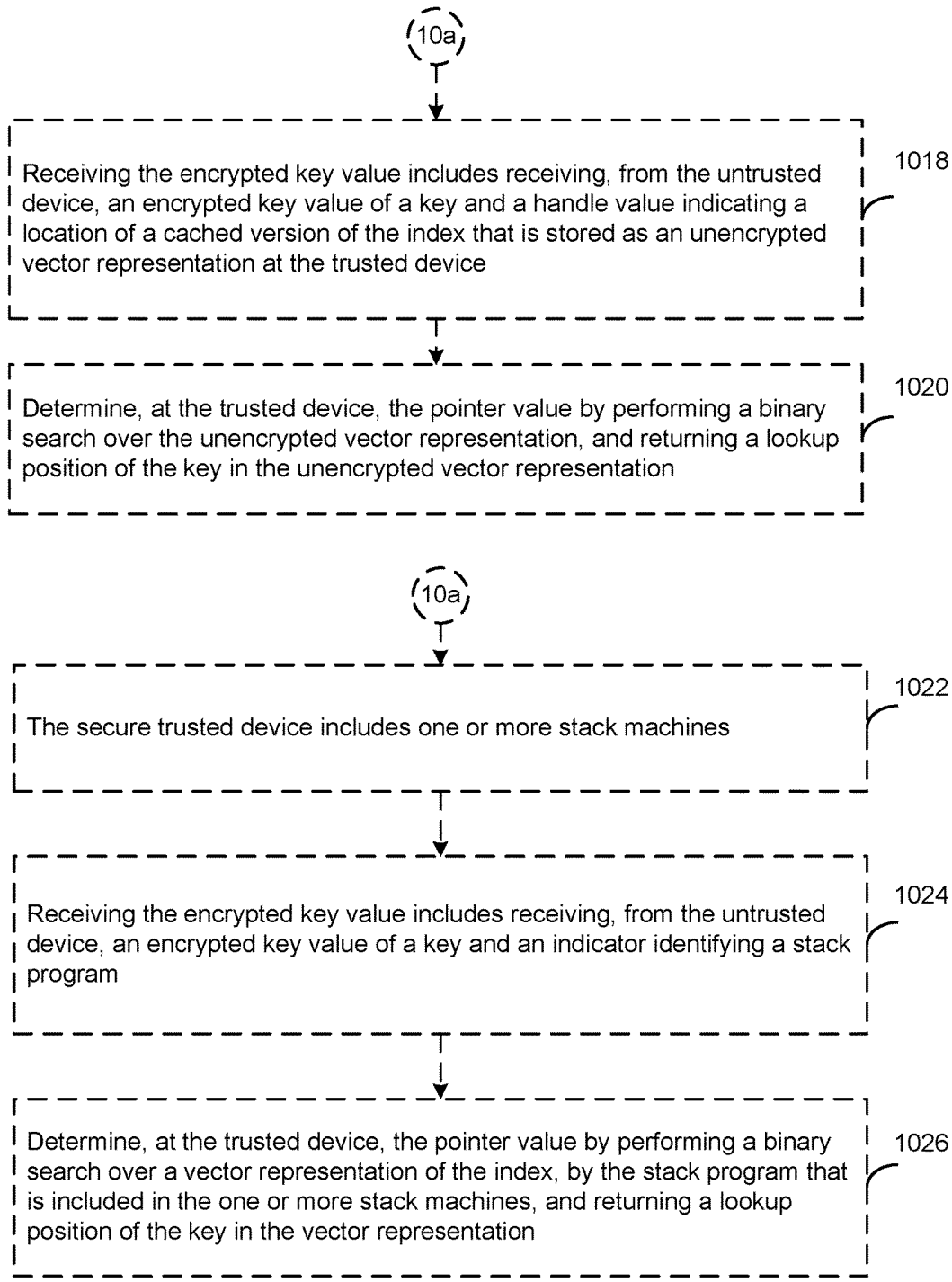

For example, receiving the encrypted key value may include receiving, from the untrusted device, an encrypted key value of a key and a handle value indicating a location of a cached version of the index that is stored as an unencrypted vector representation at the trusted device (1018), as shown in FIG. 10C.

For example, the pointer value may be determined, at the trusted device, by performing a binary search over the unencrypted vector representation, and returning a lookup position of the key in the unencrypted vector representation (1020).

For example, the secure trusted device may include one or more stack machines (1022).

For example, receiving the encrypted key value may include receiving, from the untrusted device, an encrypted key value of a key and an indicator identifying a stack program (1024).

For example, the pointer value may be determined, at the trusted device, by performing a binary search over a vector representation of the index, by the stack program that is included in the one or more stack machines, and returning a lookup position of the key in the vector representation (1026).

Figure 10D:
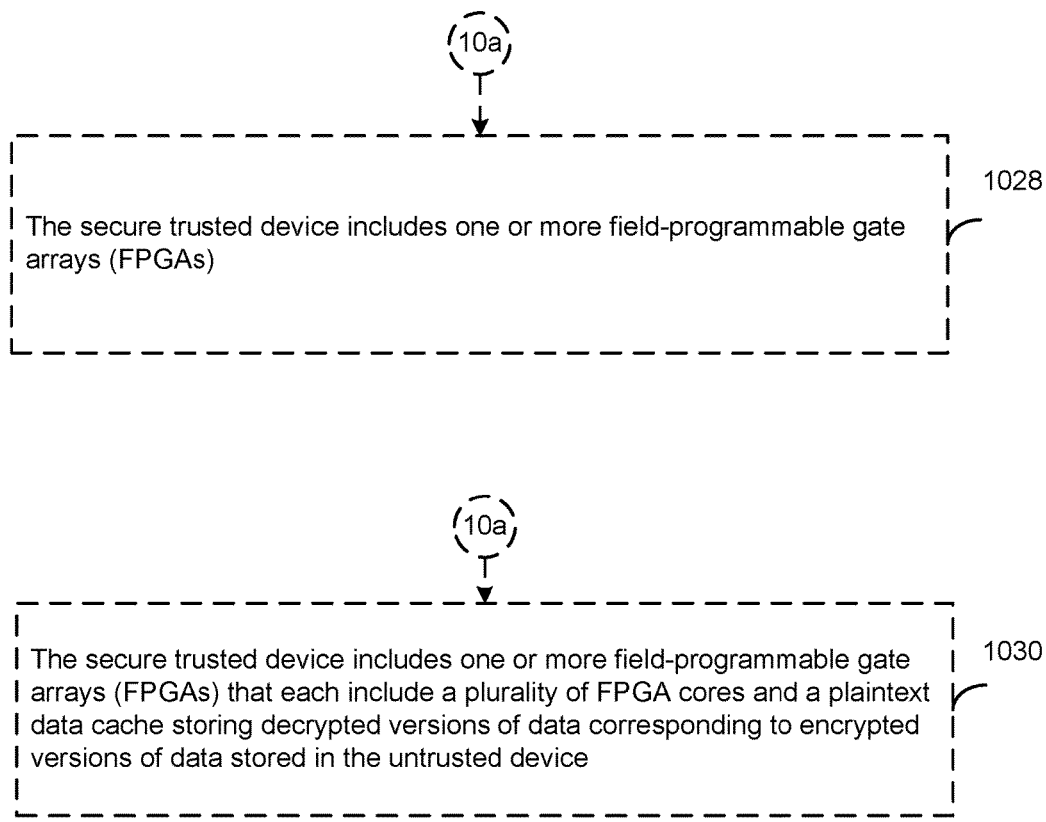

For example, the secure trusted device may include one or more field-programmable gate arrays (FPGAs) (1028), as shown in FIG. 10D.

For example, the secure trusted device may include one or more field-programmable gate arrays (FPGAs) that each include a plurality of FPGA cores and a plaintext data cache storing decrypted versions of data corresponding to encrypted versions of data stored in the untrusted device (1030).

Figure 11A:
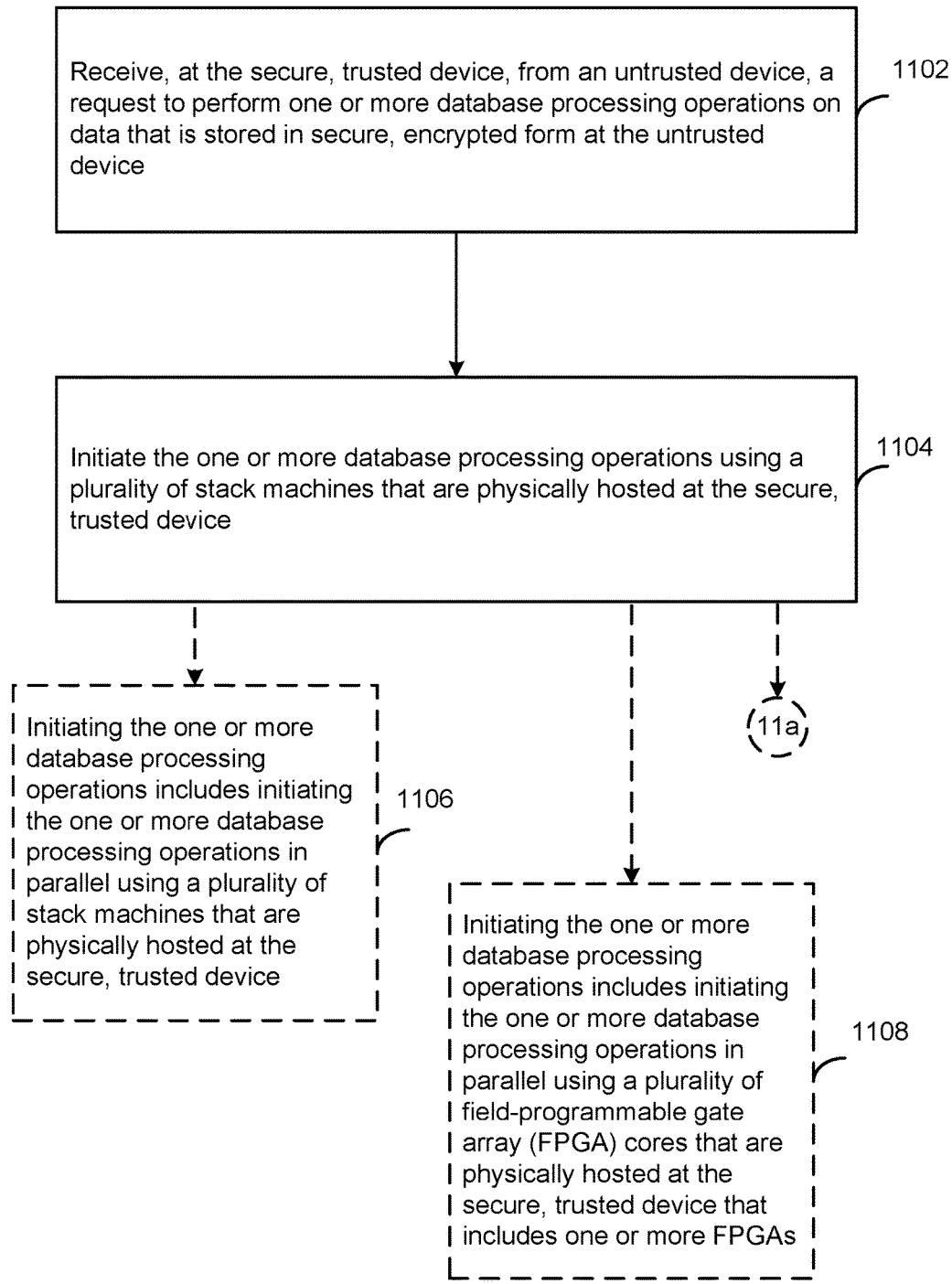
FIGS. 11A-11C are a flowchart illustrating example operations of the system of FIG. 9.
Figure 11B:
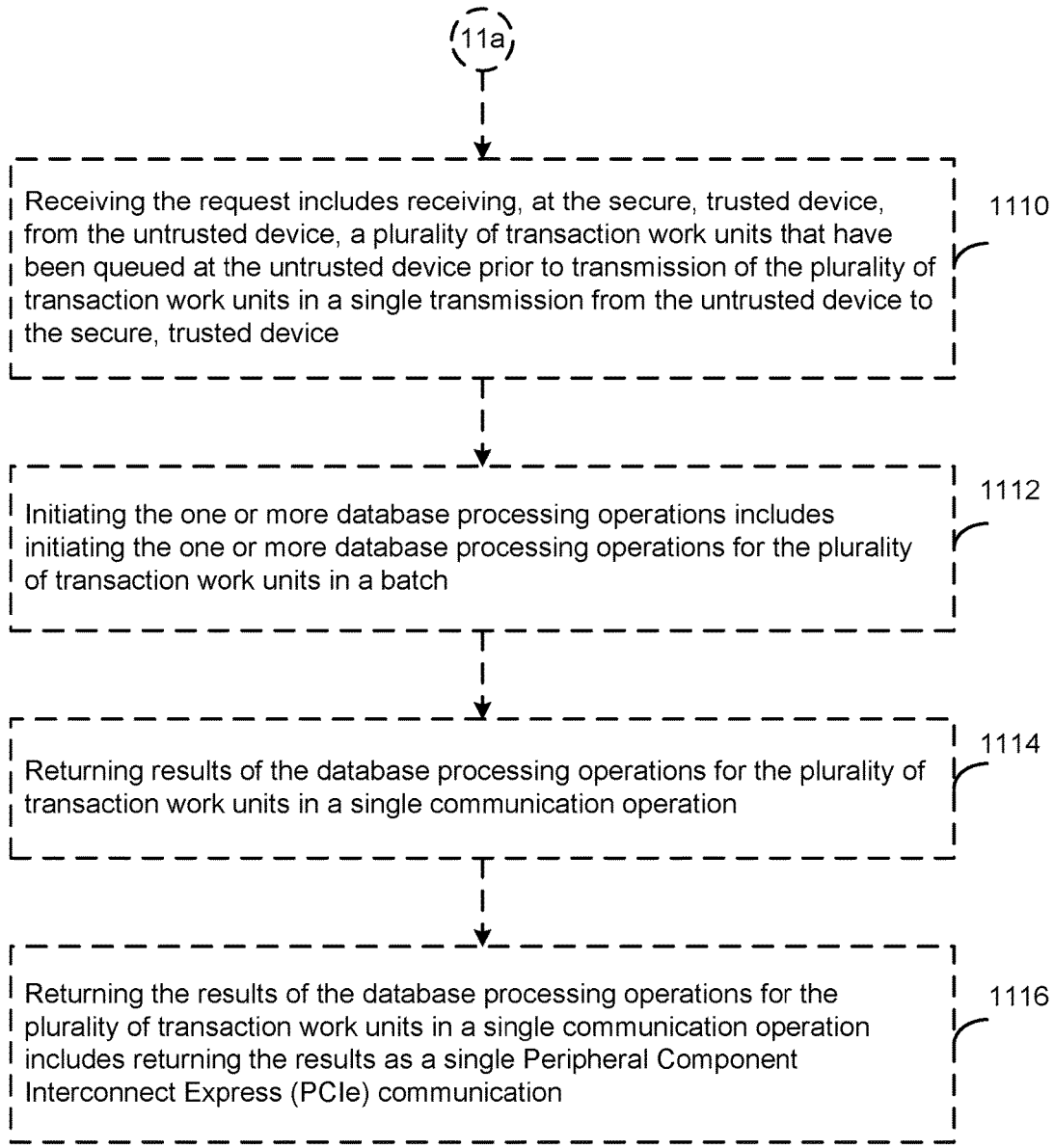
Figure 11C:
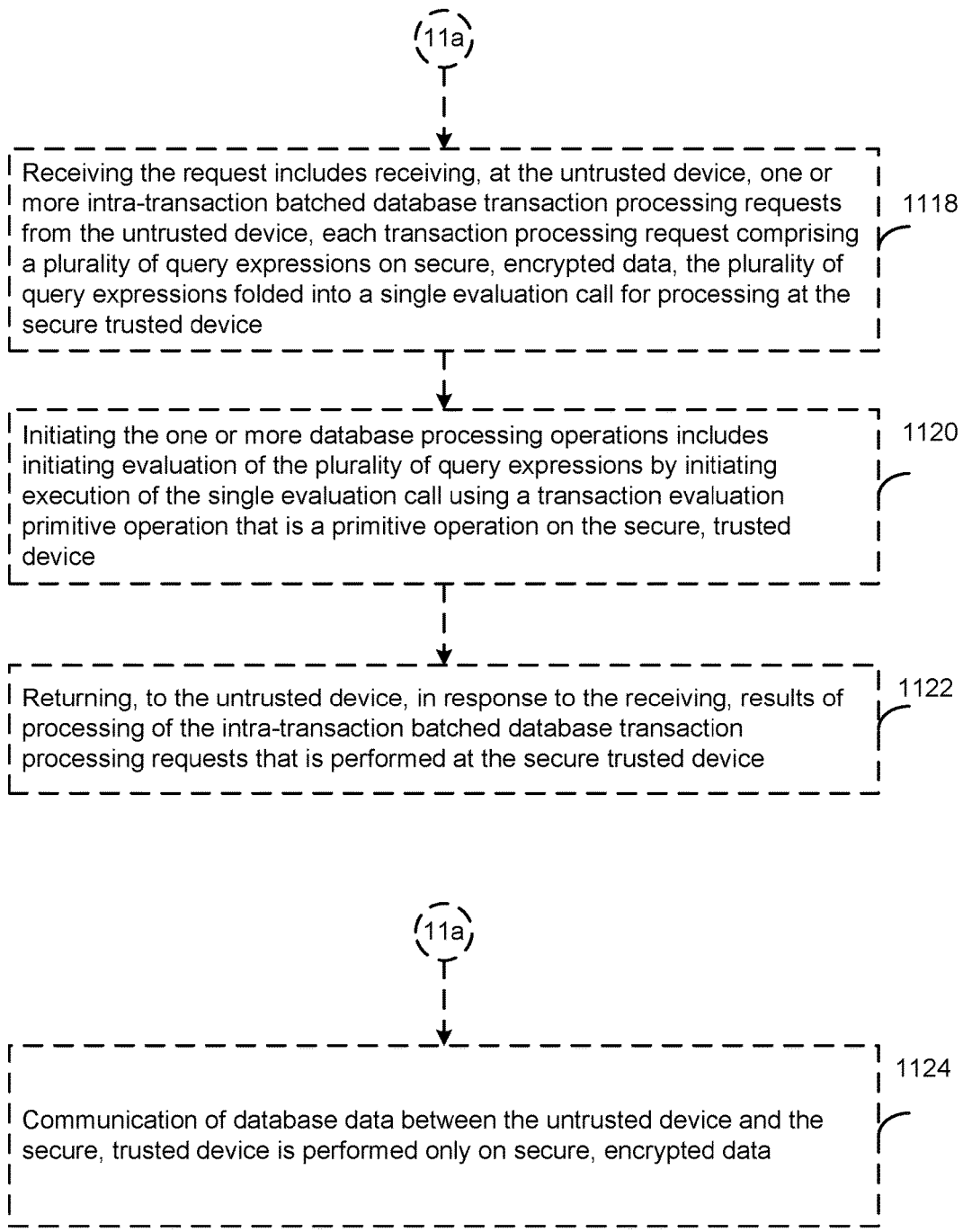

FIGS. 11A-11C are a flowchart illustrating example operations of the system of FIG. 9, according to example embodiments. As shown in the example of FIG. 11A, a request to perform one or more database processing operations on data that is stored in secure, encrypted form at the untrusted device is received from an untrusted device, at a secure, trusted device (1102).

One or more database processing operations is initiated using a plurality of stack machines that are physically hosted at the secure, trusted device (1104).

For example, initiating the one or more database processing operations may include initiating the one or more database processing operations in parallel using a plurality of stack machines that are physically hosted at the secure, trusted device (1106).

For example, initiating the one or more database processing operations may include initiating the one or more database processing operations in parallel using a plurality of field-programmable gate array (FPGA) cores that are physically hosted at the secure, trusted device that includes one or more FPGAs (1108).

For example, receiving the request may include receiving, at the secure, trusted device, from the untrusted device, a plurality of transaction work units that have been queued at the untrusted device prior to transmission of the plurality of transaction work units in a single transmission from the untrusted device to the secure, trusted device (1110), as in FIG. 11B.

For example, initiating the one or more database processing operations may include initiating the one or more database processing operations for the plurality of transaction work units in a batch (1112).

For example, returning results of the database processing operations for the plurality of transaction work units may be returned in a single communication operation (1114).

For example, returning the results of the database processing operations for the plurality of transaction work units in a single communication operation may include returning the results as a single Peripheral Component Interconnect Express (PCIe) communication (1116).

For example, receiving the request may include receiving, at the untrusted device, one or more intra-transaction batched database transaction processing requests from the untrusted device, each transaction processing request comprising a plurality of query expressions on secure, encrypted data, the plurality of query expressions folded into a single evaluation call for processing at the secure trusted device (1118), as in FIG. 11C.

For example, initiating the one or more database processing operations may include initiating evaluation of the plurality of query expressions by initiating execution of the single evaluation call using a transaction evaluation primitive operation that is a primitive operation on the secure, trusted device (1120).

For example, results of processing of the intra-transaction batched database transaction processing requests that is performed at the secure trusted device may be returned, to the untrusted device, in response to the receiving (1122).

For example, communication of database data between the untrusted device and the secure, trusted device may be performed only on secure, encrypted data (1124).

FIG. 12 is a flowchart illustrating example operations of the system of FIG. 9, according to example embodiments. As shown in the example of FIG. 12, one or more intra-transaction batched database transaction processing requests is obtained at an untrusted device, each transaction processing request comprising a plurality of query expressions on secure, encrypted data, the plurality of query expressions folded into a single evaluation call for processing at a secure trusted device (1202).

The one or more intra-transaction batched database transaction processing requests is transmitted in a single communication operation, from the untrusted device, to the secure trusted device (1204).

Results of processing of the intra-transaction batched database transaction processing requests that is performed at the secure trusted device, is received from the secure trusted device (1206).

For example, obtaining the one or more intra-transaction batched database transaction processing requests may include obtaining the one or more intra-transaction batched database transaction processing requests from a client device that is configured to perform expression folding, to fold the plurality of query expressions into the single evaluation call for processing at the secure trusted device (1208).

For example, obtaining the one or more intra-transaction batched database transaction processing requests may include obtaining the one or more intra-transaction batched database transaction processing requests by performing expression folding, to fold the plurality of query expressions into the single evaluation call for processing at the secure trusted device (1210).

One skilled in the art of computing will appreciate that many other types of techniques may be used for optimizing performance of an EDBMS, without departing from the spirit of the discussion herein.

Features discussed herein are provided as example embodiments that may be implemented in many different ways that may be understood by one of skill in the art of computing, without departing from the discussion herein. Such features are to be construed only as example embodiment features, and are not intended to be construed as limiting to only those detailed descriptions.

In this context, a "processor" may include a single processor or multiple processors configured to process instructions associated with a computing system. A processor may thus include one or more processors executing instructions in parallel and/or in a distributed manner.

For example, the system 900 may include one or more processors. For example, the system 900 may include at least one tangible computer-readable storage medium storing instructions executable by the one or more processors, the executable instructions configured to cause at least one processor to perform operations associated with various example components included in the system 900, as discussed herein. For example, the one or more processors may be included in at least one processing apparatus. One skilled in the art of computing will understand that there are many configurations of processors and processing apparatuses that may be configured in accordance with the discussion herein, without departing from the spirit of such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

Customer privacy and confidentiality have been ongoing considerations in computing environments for many years. Thus, example techniques for maintaining a database may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a machine usable or machine readable storage device (e.g., a magnetic or digital medium such as a Universal Serial Bus (USB) storage device, a tape, hard disk drive, compact disk (CD), digital video disk (DVD), etc.), storing executable instructions (e.g., a computer program), for execution by, or to control the operation of, a computing apparatus (e.g., a data processing apparatus), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a trusted device configured to implement a plurality of stack machines;
   at least one hardware device processor; and
   a computer-readable storage medium storing executable instructions that, when executed, cause the at least one hardware device processor to implement an untrusted module,
   wherein the untrusted module is configured to:
   receive requests to perform one or more database processing operations on data that is stored in secure, encrypted form on the system;
   initiate the one or more database processing operations by sending transaction work units from the untrusted module to the trusted device, the trusted device using the plurality of stack machines to execute the transaction work units;
   queue additional transaction work units at the untrusted module while the plurality of stack machines of the trusted device are busy;
   responsive to detecting that a particular stack machine becomes available, send a batch of additional transaction work units from the untrusted module to the trusted device;
   obtain secure query results of processing the transaction work units and the additional transaction work units from the trusted device; and
   provide the secure query results in response to the requests.

2. The system of claim 1, wherein the plurality of stack machines of the trusted device are configured to execute the batch of additional transaction work units in parallel.

3. The system of claim 2, wherein the trusted device comprises a field-programmable gate array (FPGA) having a plurality of FPGA cores that are configured to execute the batch of additional transaction work units in parallel.

4. The system of claim 1, wherein the untrusted module is configured to:
   send the batch of additional transaction work units to the trusted device over a peripheral bus in a single communication operation.

5. The system of claim 4, wherein the peripheral bus is a Peripheral Component Interconnect Express (PCIe) bus and the single communication operation is a single PCIe communication.

6. The system of claim 1, wherein the untrusted module is configured to perform concurrency control operations and the trusted device is configured to perform query expression evaluation.

7. The system of claim 1, wherein the requests are received from a client device having an associated client encryption key that is provided on the trusted device and inaccessible to the untrusted module.

8. A method comprising:
   receiving requests to perform database processing operations, the requests being received by an untrusted module of a computing device;
   based at least on the requests, performing the database processing operations by sending transaction work units from the untrusted module to a trusted module having a plurality of stack machines;
   queuing additional transaction work units at the untrusted module while the plurality of stack machines of the trusted module are busy;
   responsive to detecting that a particular stack machine becomes available, sending a batch of additional transaction work units from the untrusted module to the trusted module;
   obtaining secure query results of processing the transaction work units and the additional transaction work units from the trusted module; and providing the secure query results in response to the requests.

9. The method of claim 8, further comprising:
receiving the requests over a network from a client machine; and
sending the secure query results over the network to the client machine.

10. The method of claim 8, further comprising:
responsive to detecting that the particular stack machine becomes available, sending the batch of additional transaction work units to the trusted module using a single communication over a bus.

11. The method of claim 10, the single communication comprising a direct memory access transfer to the trusted module.

12. The method of claim 10, the single communication comprising a memory-mapped input/output transfer to the trusted module.

13. The method of claim 10, each of the transaction work units and the additional transaction work units including an input parameter and an output result of a call to the trusted module.

14. The method of claim 8, further comprising:
performing concurrency control of the database processing operations in the untrusted module.

15. The method of claim 8, further comprising:
performing an equality comparison in an individual stack machine.

16. The method of claim 15, the equality comparison comprising:
pushing a first encrypted value onto the top of a stack;
decrypting the first encrypted value to obtain a first decrypted value on top of the stack;
pushing a second encrypted value onto the top of the stack;
decrypting the second encrypted value to obtain a second decrypted value on top of the stack;
comparing the first decrypted value and the second decrypted value at the top of the stack to obtain a comparison result; and
outputting the comparison result from the trusted module.

17. The method of claim 8, further comprising:
performing a mathematical operation in an individual stack machine, the mathematical operation comprising:
pushing an encrypted value onto the top of a stack;
decrypting the encrypted value to obtain a decrypted value;
pushing another value onto the top of the stack;
adding the decrypted value to the another value to obtain a result;
encrypting the result to obtain an encrypted result; and
outputting the encrypted result from the trusted module.

18. A system comprising:
at least one hardware device processor; and
a computer-readable storage medium storing executable instructions that, when executed, cause the at least one hardware device processor to implement an untrusted module,
wherein the untrusted module is configured to:
receive requests to perform one or more database processing operations on data that is stored in secure, encrypted form by the system;
initiate the one or more database processing operations by sending transaction work units from the untrusted module to a trusted module having a plurality of stack machines configured to execute the transaction work units;
queue additional transaction work units at the untrusted module while the plurality of stack machines of the trusted module are busy;
responsive to detecting that a particular stack machine becomes available, send a batch of additional transaction work units from the untrusted module to the trusted module;
obtain secure query results of processing the transaction work units and the additional transaction work units from the trusted module; and
provide the secure query results in response to the requests.

19. The system of claim 18, wherein the additional transaction work units of the batch comprise input parameters that are processed in parallel by the trusted module.

20. The system of claim 18, further comprising the trusted module.

* * * * *